United States Patent
Kaku et al.

(10) Patent No.: US 6,850,030 B2
(45) Date of Patent: Feb. 1, 2005

(54) METHOD AND DEVICE FOR CONTROLLING CURRENTS OF SYNCHRONOUS MOTOR

(75) Inventors: Souki Kaku, Fukuoka (JP); Ryuichi Oguro, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/482,392

(22) PCT Filed: Jul. 3, 2002

(86) PCT No.: PCT/JP02/06746
§ 371 (c)(1),
(2), (4) Date: Dec. 31, 2003

(87) PCT Pub. No.: WO03/005556
PCT Pub. Date: Jan. 16, 2003

(65) Prior Publication Data
US 2004/0178764 A1 Sep. 16, 2004

(30) Foreign Application Priority Data
Jul. 4, 2001 (JP) ............................... 2001-203576
Jul. 10, 2001 (JP) ............................... 2001-209395

(51) Int. Cl.[7] .............................. H02P 1/24; H02P 7/36
(52) U.S. Cl. .................... 318/727; 318/700; 318/702; 318/804
(58) Field of Search ............................ 318/138, 254, 318/700–703, 715, 799, 727–729, 800–812; 363/40–43

(56) References Cited

U.S. PATENT DOCUMENTS

| | | | |
|---|---|---|---|
| 5,698,823 A | | 12/1997 | Tanahashi |
| 5,714,857 A | * | 2/1998 | Mannel et al. ............... 318/432 |
| 6,281,656 B1 | * | 8/2001 | Masaki et al. ............... 318/700 |
| 6,456,030 B1 | * | 9/2002 | Masaki et al. ............... 318/700 |
| 6,566,840 B1 | * | 5/2003 | Wu et al. .................... 318/727 |
| 6,577,096 B2 | * | 6/2003 | Cho ............................ 318/727 |
| 6,630,809 B2 | * | 10/2003 | Chen et al. .................. 318/804 |
| 6,636,012 B2 | * | 10/2003 | Royak et al. ................ 318/727 |
| 2001/0002784 A1 | * | 6/2001 | Masaki et al. ............... 318/727 |
| 2001/0048283 A1 | * | 12/2001 | Kaitani et al. ............... 318/700 |
| 2002/0163319 A1 | * | 11/2002 | Kaneko et al. .............. 318/727 |
| 2003/0001536 A1 | * | 1/2003 | Kitajima ...................... 318/629 |
| 2003/0062870 A1 | * | 4/2003 | Royak et al. ................ 318/727 |
| 2003/0128009 A1 | * | 7/2003 | Sakurai et al. ............... 318/722 |
| 2003/0151385 A1 | * | 8/2003 | Wu et al. .................... 318/727 |

FOREIGN PATENT DOCUMENTS

| | | |
|---|---|---|
| JP | 9-292901 A | 11/1997 |
| JP | 11-18499 A | 1/1999 |
| JP | 2002-136175 A | 5/2002 |
| JP | 2003-33074 * | 1/2003 |

* cited by examiner

*Primary Examiner*—Paul Ip
(74) *Attorney, Agent, or Firm*—Sughrue Mion, PLLC

(57) ABSTRACT

There are performed converting electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor; estimating a d-axis simulated current Idob and a q-axis simulated current Iqob on the basis of the d-axis actual current Idfb, the q-axis actual current Iqfb, a d-axis actual voltage command Vdref, and a q-axis actual voltage command Vqref; generating a d-axis actual voltage command Vdref and a q-axis actual voltage command Vqref on the basis of a d-axis current command Idref, a q-axis current command Iqref, a d-axis simulated current Idob, and a q-axis simulated current Iqob; and converting the d-axis actual voltage command Vdref and the q-axis actual voltage command Vqref into actual voltage commands Vuref, Vvref, and Vwref on the basis of the actual position θ of a rotor of the synchronous motor. As a result, there can be provided a method and apparatus for controlling an electric current of a synchronous motor, which can provide a superior current response characteristic regardless of the influence of temperature.

16 Claims, 10 Drawing Sheets

METHOD AND DEVICE FOR CONTROLLING CURRENTS OF SYNCHRONOUS MOTOR

FIELD OF THE INVENTION

The invention relates to a method and apparatus for controlling an electric current of a linear motor and a synchronous motor for driving a load machine; e.g., a table or a robot arm of a machine tool.

RELATED ART

A current controller (hereinafter also called a "first related-art device") of a synchronous motor such as shown in FIG. 7 has hitherto been available as a current controller of a related-art synchronous motor for achieving a high-speed response characteristic.

A first related-art device shown in FIG. 7 is described as a current controller of a synchronous motor utilizing a current feedforward in JP-A-11-18469. The first related-art device will now be described briefly by reference to FIG. 7.

In FIG. 7, reference numeral 1 designates a synchronous motor; 2 designates an actual position observation device; 3 designates an actual current observation section; 4 designates a power conversion circuit; 5 designates a first coordinate converter; 6 designates a second coordinate converter; 20 designates a feedback control section; 12 designates a feedforward control section; and 13 designates a voltage command synthesis section.

The actual current observation section 3 observes an electric current of two phases or more of the synchronous motor 1, thereby providing actual currents Iu, Iv, and Iw.

The actual position observation device 2 functions as an encoder and provides an actual position θ of a rotor of the synchronous motor 1.

On the basis of the actual position θ and the actual currents Iu, Iv, and Iw, the second coordinate converter 6 converts the currents into a d-axis actual current Idfb and a q-axis actual current Iqfb, which fall on a rotational coordinate axis that rotates in synchronism with a rotor magnetic flux vector of the synchronous motor.

The first coordinate converter 5 converts a d-axis actual voltage command Vdref and a q-axis actual voltage command Vqref into actual voltage commands Vuref, Vvref, and Vwref on the basis of the actual position θ so as to be supplied to the power conversion circuit 4.

On the basis of the d-axis current command Idref and the q-axis current command Iqref, the feedforward control section 12 produces a d-axis second simulated current command Idff, a q-axis second simulated current command Iqff, a d-axis second simulated voltage command Vdff, and a q-axis second simulated voltage command Vqff.

On the basis of the d-axis second simulated current command Idff, the q-axis second simulated current command Iqff, the d-axis simulated current, and the q-axis simulated current, the feedback control section 20 produces a d-axis third simulated voltage command vdfb and a q-axis third simulated voltage command Vqfb.

On the basis of the d-axis second simulated voltage command Vdff, the q-axis second simulated voltage command Vqff, the d-axis third simulated voltage command Vdfb, and the q-axis third simulated voltage command Vqfb, the voltage command synthesizer 13 produces a d-axis actual voltage command Vdref and a q-axis actual voltage command Vqref.

In the current controller of the above-described synchronous motor, the feedforward control section 12 produces the d-axis second simulated current command Idff, the q-axis second simulated current Iqff, the d-axis second simulated voltage command vdff, and the q-axis second simulated voltage command Vqff on the basis of the d-axis current command Idref and the q-axis current command Iqref. These produced current commands are provided to the feedback control section 20 as well as to the voltage command synthesizer 13, whereby current control with high-speed response can be attained without generating an overshoot of step response.

A controller of a synchronous motor (hereinafter called a "second related-art device") such as that shown in FIG. 10 has already been available as another controller of the related-art synchronous motor.

The second related-art device will now be described briefly by reference to FIG. 10.

In FIG. 10, reference numeral 81 designates a synchronous motor; 82 designates an actual position observation device; 83 designates an actual current observation section; 84 designates a power conversion circuit; 85 designates a second coordinate conversion circuit; 86 designates a first coordinate conversion circuit; 87 designates a current control section; 88 designates a machine control section; and 91 designates a differentiator.

The actual current observation section 83 observes an electric current of two phases or more of the synchronous motor 81, thereby supplying the actual currents Iu, Iv, and Iw.

The actual position observation device 82 functions as an encoder and provides an actual rotor position θ of the synchronous motor 81.

On the basis of the actual position θ as well as the actual currents Iu, Iv, and Iw, the first coordinate conversion circuit 86 converts these currents into a d-axis actual current Id and a q-axis actual current Iq, which fall on a rotational coordinate axis that rotates in synchronism with a rotor magnetic flux vector of the synchronous motor.

On the basis of the actual position θ, the second coordinate converter 85 converts a d-axis voltage command vdref and a q-axis voltage command Vqref into actual voltage commands Vuref, Vvref, and Vwref so as to be supplied to the power conversion circuit 84.

On the basis of a torque command Tref, the d-axis actual current Id, the q-axis actual current Iq, and the actual position θ, the current control section 87 performs current control operation and produces the d-axis voltage command Vdref and the q-axis voltage command Vqref.

On the basis of the actual position θ, the differentiator 91 produces an estimated speed "w". For instance, the following method is commonly employed.

$$w(k)=(\theta(k)-\theta(k-1))/T$$

where T is a sampling time and (k) is a signal value at a time k*T.

The machine control section 88 performs machine control operation on the basis of the actual command θref, the actual position θ of the rotor of the synchronous motor, and the estimated speed "w," thereby providing the torque command Tref.

The actual position θ and the estimated speed "w" are supplied to the machine control section 88, which enables the synchronous motor 81 to respond stably and quickly to the actual command θref.

However, the first related-art device is intended for improving a response characteristic with respect to the d-axis current command Idref and the q-axis current command Iqref, and it is not intended for enhancing a feedback characteristic. Accordingly, when variations arise in parameters or power of the synchronous motor 1 or the power conversion section 4 due to influence of temperature, vibration or overshooting might be generated in the step response, which deteriorates a response characteristic of the electric current.

DISCLOSURE OF THE INVENTION

Consequently, a first object of the invention is to provide a method and apparatus for controlling an electric current of a synchronous motor, which provides a superior current response characteristic even when variations arise in parameters or power of the synchronous motor 1 and the power conversion section 4 under the influence of temperature.

In the second related-art device, the actual position θ has been quantized, and a quantization error is present in θ(k). We have $$wm(k) \neq w(k),$$

where wm denotes an actual speed of a synchronous motor.

For instance, in the case of an encoder which produces 10000 pulses/rotation, maximum positional accuracy of the actual position θ is 1/10000 rotations.

When a sampling time is 100 μs, "w" has a resolving power of 1 pulse/100 μs; that is, 10000 pulses/s or 60 rpm.

When the sampling time is 10 μs, the "w" has a resolving power of 1 pulse/10 μs; that is, 100000 pulses/s or 600 rpm.

In the case of a single encoder, the resolving power of "w" becomes considerably deteriorated as a result of shortening of the sampling time. Therefore, a vibration component in the torque command Tref produced by the machine control section 88 becomes greater, and the speed gain cannot be set to a high level, which in turn deteriorates responsiveness of the synchronous motor.

In order to solve the problem, the resolving power of the encoder has hitherto been increased. However, an increase in resolving power of the encoder ends up increasing the cost.

Therefore, a second object of the invention is to provide a method and apparatus for controlling a synchronous motor which provides superior responsiveness and robustness without an increase in resolving power of an encoder even when a sampling time is shortened.

In order to achieve the first object, an invention which is defined in claim 1 and pertains to a method for controlling an electric current of a synchronous motor is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: conversion of electric currents Iu, Iv, and Iw flowing through the synchronous motor into a d-axis actual current Idfb and a q-axis actual current Iqfb on rotational coordinate axes which rotate in synchronism with a rotor magnetic flux vector, on the basis of an actual position θ of the rotor of the synchronous motor; estimation of a d-axis simulated current Idob and a q-axis simulated current Iqob on the basis of the d-axis actual current Idfb, the q-axis actual current Iqfb, a d-axis actual voltage command Vdref, and a q-axis actual voltage command Vqref; generation of the d-axis actual voltage command Vdref and the q-axis actual voltage command Vqref on the basis of a d-axis current command Idref, a q-axis current command Iqref, the d-axis simulated current Idob, and the q-axis simulated current Iqob; and conversion of the d-axis actual voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 1, a current feedback gain can be set to a high level. A superior current response characteristic can be provided even when variations arise in parameters or power of the synchronous motor 1 and the power conversion section 4 under the influence of temperature.

A method for controlling an electric current of a synchronous motor defined in claim 2 is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: conversion of electric currents Iu, Iv, and Iw flowing through the synchronous motor into a d-axis actual current Idfb and a q-axis actual current Iqfb on rotational coordinate axes which rotate in synchronism with a rotor magnetic flux vector, on the basis of an actual position θ of the rotor of the synchronous motor; estimation of a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo; generation of the d-axis first simulated voltage command Vdo and the q-axis first simulated voltage command Vqo on the basis of a d-axis current command Idref, a q-axis current command Iqref, the d-axis simulated current Idob, and the q-axis simulated current Iqob; addition of an induced voltage to the d-axis first simulated voltage command Vdo and the q-axis first simulated voltage command Vqo on the basis of actual position θ of a rotor of the synchronous motor, to thereby produce a d-axis actual voltage command Vdref and a q-axis actual voltage command Vqref; and conversion of the d-axis actual voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 2, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change has arisen in the rotational speed of the synchronous motor, a superior current response characteristic can be obtained.

A method for controlling an electric current of a synchronous motor defined in claim 3 is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: generation of a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref; conversion of electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor; estimation of ad-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo; generation of a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; generation of the d-axis first simulated voltage command Vdo and the q-axis first simulated voltage command Vqo on the basis of the d-axis third simulated voltage command Vdfb, the q-axis third simulated voltage command Vqfb, the d-axis second simulated voltage command Vdff, and the q-axis second simulated voltage command Vqff; addition of an induced voltage to the d-axis first simulated voltage command Vdo and the q-axis first simulated voltage command Vqo on the basis of an actual position θ of a rotor of the synchronous motor, to thereby produce a d-axis actual voltage command Vdref and a q-axis actual voltage command Vqref; and conversion of the d-axis actual voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 3, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change has arisen in the rotational speed of the synchronous motor, a superior current response characteristic can be obtained. Moreover, a faster current response characteristic in response to the command can be obtained.

A method for controlling an electric current of a synchronous motor defined in claim 4 is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: conversion of electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor; estimation of a d-axis simulated current Idob, a q-axis simulated current Iqob, a d-axis simulated disturbance voltage Vdob, and a q-axis simulated voltage command Vqob on the basis of the d-axis actual current Idfb, the q-axis actual current Iqfb, a d-axis actual voltage command Vdref, and a q-axis actual voltage command Vqref; generation of a d-axis first simulated voltage command Vdo and a q-axis first simulated voltage command Vqo on the basis of a d-axis current command Idref, a q-axis current command Iqref, the d-axis simulated current Idob, and the q-axis simulated current Iqob; generation of the d-axis actual voltage command Vdref and the q-axis actual voltage command Vqref on the basis of the d-axis third simulated voltage command Vdfb, the q-axis third simulated voltage command Vqfb, the d-axis simulated disturbance voltage Vdob, and the q-axis simulated disturbance voltage Vqob; and conversion of the d-axis actual voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 4, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained.

A method for controlling an electric current of a synchronous motor defined in claim 5 is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: generation of a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref; conversion of electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor; estimation of a d-axis simulated current Idob, a q-axis simulated current Iqob, a q-axis simulated disturbance voltage Vdob, and a q-axis simulated disturbance voltage Vqob on the basis of the d-axis actual current Idfb, the q-axis actual current Iqfb, ad-axis actual voltage command Vdref, and a q-axis actual voltage command Vqref; generation of a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; generation of the d-axis actual voltage command Vdref and the q-axis actual voltage command Vqref on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; and conversion of the d-axis voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 5, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained. Moreover, a faster current response characteristic can be obtained in response to the command.

A method for controlling an electric current of a synchronous motor defined in claim 6 is directed toward a method for controlling an electric current of a synchronous motor in which a power conversion circuit is provided with an appropriate actual voltage command such that an electric current flowing through the synchronous motor fed with power from the power conversion circuit coincides with a current command, the method comprising: generation of a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref; conversion of electric currents. Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor; estimation of a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, a d-axis first simulated voltage command Vdo, and a q-axis actual voltage command Vqo; generation of a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; generation of the d-axis first simulated voltage command Vdo and the q-axis actual voltage command Vqo on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; addition of an induced voltage to the d-axis first simulated voltage command Vdo and the q-axis first simulated voltage command Vqo on the basis of the actual position θ of a rotor of the synchronous motor, to thereby produce a d-axis actual voltage command Vdref and a q-axis actual voltage command Vqref; and conversion of the d-axis voltage command Vdref and the q-axis actual voltage command Vqref into actual voltage commands Vuref, Vvref, and Vwref on the basis of the actual position θ of a rotor of the synchronous motor.

According to the method for controlling an electric current of a synchronous motor defined in claim 6, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained. Moreover, a faster current response characteristic can be obtained in response to the command. In addition, even when an abrupt change has arisen in the rotational speed of the synchronous motor, a superior current response characteristic can be obtained.

A current controller of a synchronous motor defined in claim 7 is directed toward a current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a current observer 10a which estimates a d-axis simulated current Idob and a q-axis simulated current Iqob on the basis of the d-axis actual current Idfb, the q-axis actual current Iqfb, a d-axis actual voltage command Vdref, and a q-axis actual voltage command Vqref; a feedback control section 9a which produces the d-axis actual voltage command Vdref and the q-axis actual voltage command Vqref on the basis of the d-axis current command Idref, the q-axis current command Iqref, the d-axis simulated current Idob, and the q-axis simulated current Iqob; and a first coordinate converter 5 for converting the d-axis actual voltage command Vdref and the q-axis actual voltage command Vqref into the actual voltage commands Vuref, Vvref, and Vwref on the basis of the actual position θ.

According to the current controller of a synchronous motor defined in claim 7, a current feedback gain can be set to a high level. Hence, even when variations arise in parameters and power of the synchronous motor 1 and the power conversion circuit 4 under the influence of temperature, a superior current response characteristic can be obtained.

A current controller of a synchronous motor defined in claim 8 is directed toward a current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a current observer 10b which estimates a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo; a feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob; a speed generator 8 for producing an actual speed "w" on the basis of the actual position θ; an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

According to the current controller of a synchronous motor defined in claim 8, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change has arisen in the rotational speed of the synchronous motor, a superior current response characteristic can be obtained.

A current controller of a synchronous motor defined in claim 9 is directed toward a current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a current observer 10b which estimates a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo; a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref; a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; a voltage command synthesizer 13 which produces the d-axis first simulated voltage command Vdo and the q-axis first simulated voltage command Vqo on the basis of the d-axis third simulated voltage command Vdfb, the q-axis third simulated voltage command Vqfb, the d-axis second simulated voltage command Vdff, and the q-axis second simulated voltage command Vqff; a feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob; a speed generator 8 for producing an actual speed "w" on the basis of the actual position θ; an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

According to the current controller of a synchronous motor defined in claim 9, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change has arisen in the rotational speed of the synchronous motor, a superior current response characteristic can be obtained. Moreover, a faster current response characteristic in response to the command can be obtained.

A current controller of a synchronous motor defined in claim 10 is directed toward a current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a current observer 14a which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, the d-axis actual voltage command Vdref, and the q-axis actual voltage command Vqref; a feedback control section 9b which produces a d-axis first simulated voltage command Vdo and a q-axis first simulated voltage command Vqo on the basis of the d-axis current command Idref, the q-axis current command Iqref, the d-axis simulated current Idob, and the q-axis simulated current Iqob; a voltage command synthesizer 15 which produces the d-axis actual voltage command Vdref and the q-axis actual voltage command Vqref on the basis of the d-axis third simulated voltage command Vdfb, the q-axis third simulated voltage command Vqfb, the d-axis simulated disturbance voltage Vdob, and the q-axis simulated disturbance voltage Vqob; and a first coordinate converter 5 for converting the d-axis actual voltage command Vdref and the q-axis actual voltage command Vqref into the actual voltage commands Vuref, Vvref, and Vwref on the basis of the actual position θ.

According to the electric controller of a synchronous motor defined in claim 10, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained.

A current controller of a synchronous motor defined in claim 11 is directed toward a current controller of a synchronous motor which provides the power conversion circuit 4 with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on rotational coordinate axes which rotate synchronously with the rotor magnetic flux vector of the synchronous motor; a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref; a current observer 14*a* which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, the d-axis actual voltage command Vdref, and the q-axis actual voltage command Vqref; a feedback control section 11 which produces a d-axis third simulated voltage command Vdfb and a d-axis third simulated voltage command Vqfb on the basis of the d-axis second simulated current command Idff, the q-axis second simulated current command Iqff, the d-axis simulated current Idob, and the q-axis simulated current Iqob; a voltage command synthesizer 16 which produces the d-axis actual voltage command Vdref and the q-axis actual voltage command Vqref on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; and a first coordinate converter 5 for converting the d-axis actual voltage command Vdref and the q-axis actual voltage command Vqref into the actual voltage commands Vuref, Vvref, and Vwref on the basis of the actual position θ.

According to the electric controller of a synchronous motor defined in claim 11, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained. Moreover, a faster current response characteristic can be obtained in response to the command.

A current controller of a synchronous motor defined in claim 12 is directed toward a current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref; a current observer 14*b* which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, a d-axis first simulated voltage command Vdo, and a q-axis actual voltage command Vqo; a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; a voltage command synthesizer 17 which produces the d-axis first simulated voltage command Vdo and the q-axis actual voltage command Vqo on the basis of the d-axis second simulated voltage command Vdff, the q-axis second simulated voltage command Vqff, the d-axis third simulated voltage command vdfb, and the q-axis third simulated voltage command Vqfb; a speed generator 8 for producing an actual speed "w" on the basis of the actual position θ; an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to there by produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

According to the electric controller of a synchronous motor defined in claim 12, a current feedback gain can be set to a high level. Hence, even when variations arise in parameters or power of the synchronous motor 1 and the power conversion circuit 4 under the influence of temperature, a superior current response characteristic can be obtained. Further, even when an abrupt change or fluctuation has arisen in a parameter of the synchronous motor 1 and that of the power conversion circuit 4, a superior current response characteristic can be obtained. Moreover, a faster current response characteristic can be obtained in response to the command. In addition, even when an abrupt change has arisen in the rotational speed of the synchronous motor, a superior current response characteristic can be obtained.

In order to achieve the second object, an invention which is defined in claim 13 and pertains to a method for controlling a synchronous motor is directed toward a method for controlling a synchronous motor in which a power conversion circuit is provided with appropriate actual voltage commands Vuref, Vvref, and Vwref such that a synchronous motor fed with power from the power conversion circuit approaches an actual command θref, the method comprising: performance of machine control operation on the basis of the actual command θref, the actual position θ of a rotor of the synchronous motor, and an estimated speed "w," to thereby provide a torque command Tref; conversion of electric currents Iu, Iv, and Iw flowing through the synchronous motor into a d-axis actual current Id and a q-axis actual current Iq on rotational coordinate axes which rotate synchronously with a rotor magnetic flux vector, on the basis of an actual position θ of the rotor of the synchronous motor; performance of current control operation on the basis of the actual position θ, the torque command Tref, the d-axis actual current Id, and the q-axis actual current Iq, to thereby provide a d-axis voltage command Vdref and a q-axis voltage command Vqref; conversion of the d-axis voltage command Vdref and the q-axis voltage command Vqref into actual voltage commands Vuref, Vvref, and Vwref on the basis of the actual position θ; and estimation of an estimated speed "w" on the basis of the q-axis actual current Iq and the q-axis voltage command Vqref.

According to the method for controlling a synchronous motor, even when the sampling time is shortened, superior readiness and superior robustness can be obtained without involvement of an increase in the resolving power of an encoder.

An invention which is defined in claim 14 and pertains to a method for controlling a synchronous motor is directed toward a method for controlling a synchronous motor in which a power conversion circuit is provided with appropriate actual voltage commands Vuref, Vvref, and Vwref such that a synchronous motor fed with power from the power conversion circuit approaches an actual command θref, the method comprising: performance of machine control operation on the basis of the actual command θref, the actual position θ of a rotor of the synchronous motor, and an estimated speed "w," to thereby provide a torque command Tref; conversion of electric currents Iu, Iv, and Iw flowing through the synchronous motor into a d-axis actual current Id and a q-axis actual current Iq on rotational coordinate axes which rotate synchronously with a rotor magnetic flux vector, on the basis of an actual position θ of the rotor of the synchronous motor; performance of current control operation on the basis of the actual position θ, the torque command Tref, the d-axis actual current Id, and the q-axis actual current Iq, to thereby provide a d-axis voltage command Vdref and a q-axis voltage command Vqref; conversion of the d-axis voltage command Vdref and the q-axis voltage command Vqref into actual voltage commands Vuref, Vvref, and Vwref on the basis of the actual position θ; and estimation of an estimated speed "w" on the basis of the d-axis actual current Id, the q-axis actual current Iq, the d-axis voltage command Vdref, and the q-axis voltage command Vqref.

According to the method for controlling a synchronous motor, even when the sampling time is shortened, superior readiness and superior robustness can be obtained without involvement of an increase in the resolving power of an encoder. In addition, the accuracy of the estimated speed "w" becomes higher. Hence, a control gain of the machine control section can be set to a high level.

An invention which is defined in claim 15 and pertains to a current controller of a synchronous motor is directed toward a current controller of a synchronous motor in which a power conversion circuit 84 is provided with appropriate actual voltage commands Vuref, Vvref, and Vwref such that a synchronous motor 81 fed with power from the power conversion circuit 84 approaches an actual command θref, the controller comprising: an actual position observation device 82 for providing an actual position θ of the synchronous motor 81; an actual current observation section 83 which observes a current of two phases or more of the synchronous motor 81 and provides actual currents Iu, Iv, and Iw; a first coordinate conversion circuit 86 which converts, on the basis of the actual position θ, the actual currents Iu, Iv, and Iw into a d-axis actual current Id and a q-axis actual current Iq on the rotational coordinate axes which rotate synchronously with the rotor magnetic flux vector of the synchronous motor; a machine control section 88 which performs machine control operation, to thereby provide a torque command Tref on the basis of the actual command θref, the actual position θ of a rotor of the synchronous motor, and the estimated speed "w"; a current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref; a second coordinate conversion circuit 85 which provides the actual voltage commands Vuref, Vvref, and Vwref on the basis of the actual position θ, the d-axis voltage command Vdref, and the q-axis voltage command Vqref; and a first speed estimation section 89 for estimating the estimated speed "w" on the basis of the q-axis actual current Iq and the q-axis voltage command Vqref.

According to the controller of a synchronous motor, even when the sampling time is shortened, superior readiness and superior robustness can be obtained without involvement of an increase in the resolving power of an encoder.

An invention which is defined in claim 16 and pertains to a current controller of a synchronous motor is directed toward a current controller of a synchronous motor in which a power conversion circuit 84 is provided with appropriate actual voltage commands Vuref, Vvref, and Vwref such that a synchronous motor 81 fed with power from the power conversion circuit 84 approaches an actual command θref, the controller comprising: an actual position observation device 82 for providing an actual position θ of the synchronous motor 81; an actual current observation section 83 which observes a current of two phases or more of the synchronous motor 81 and provides actual currents Iu, Iv, and Iw; a first coordinate conversion circuit 86 which converts, on the basis of the actual position θ, the actual currents Iu, Iv, and Iw into a d-axis actual current Id and a q-axis actual current Iq on the rotational coordinate axes which rotate synchronously with the rotor magnetic flux vector of the synchronous motor; a machine control section 88 which performs machine control operation, to thereby provide the torque command Tref on the basis of the actual command θref, the actual position θ of the rotor of the synchronous motor, and the estimated speed "w"; a current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref; a second coordinate conversion circuit 85 which provides the actual voltage commands Vuref, Vvref, and Vwref on the basis of the actual position θ, the d-axis voltage command Vdref, and the q-axis voltage command Vqref; and a second speed estimation section 90 for estimating the estimated speed "w" on the basis of the d-axis actual current Id, the q-axis actual current Iq, the d-axis voltage command Vdref, and the q-axis voltage command Vqref.

According to the controller of a synchronous motor, even when the sampling time is shortened, superior readiness and superior robustness can be obtained without involvement of an increase in the resolving power of an encoder. Moreover, the accuracy of the estimated speed "w" becomes higher, and hence a control gain of the machine control section can be set to a high level.

Figure 1:
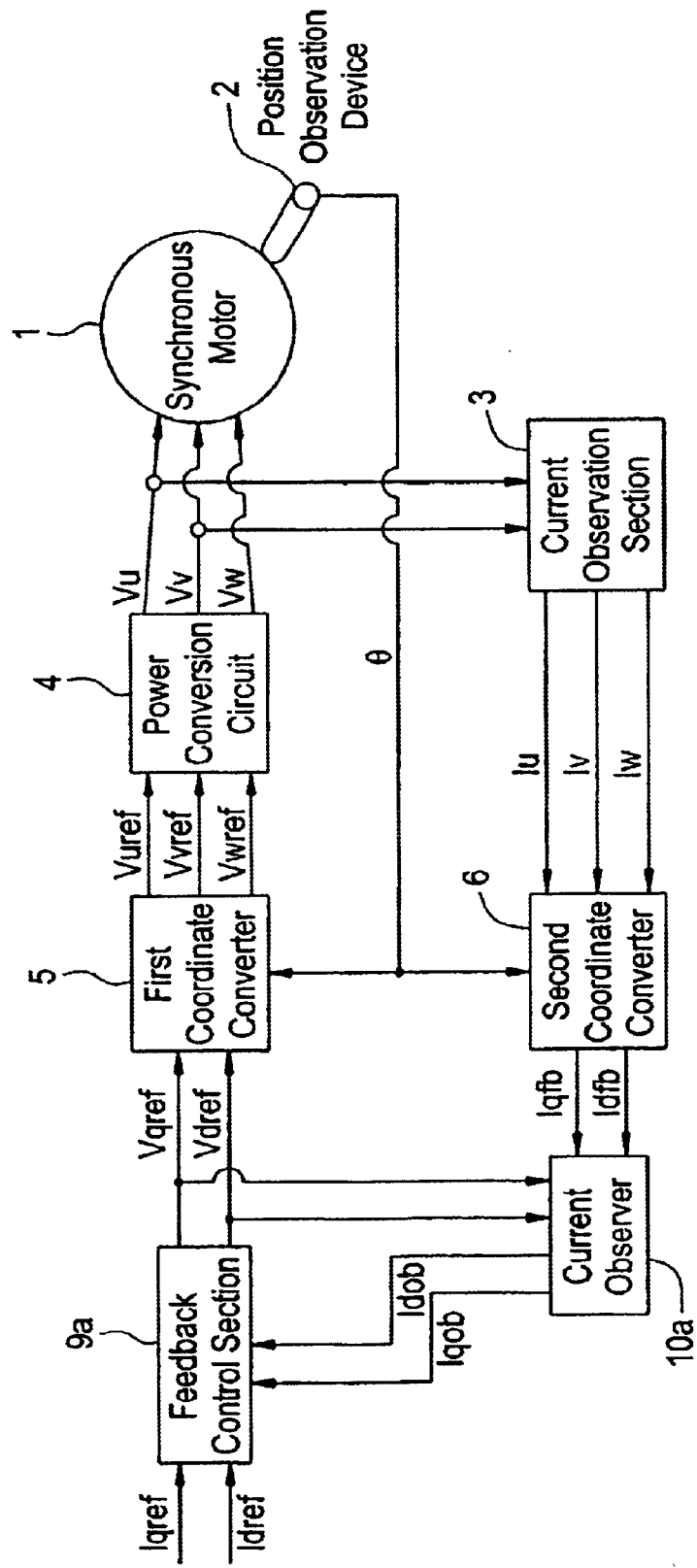
FIG. 1 is a block diagram showing the configuration of a current controller of a synchronous motor according to a first embodiment of the invention.

In the drawings, reference numeral 1 designates a synchronous motor; 2 designates an actual position observation device; 3 designates an actual current observation section; 4 designates a power conversion circuit; 5 designates a first coordinate converter; 6 designates a second coordinate converter; 7 designates an induced voltage compensation section; 8 designates a speed generation section; 9a designates a current feedback control section; 9b designates a current feedback control section; 10a designates a current observer; 10b designates a current observer; 11 designates a feedback control section; 12 designates a feedforward control section; 13 designates a voltage command synthesis section; 14a designates a current observer; 14b designates a current observer; 15 designates a voltage command synthesis section; 16 designates a voltage command synthesis section; 17 designates a voltage command synthesis section; 20 designates a feedback control section; 81 designates a synchronous motor; 82 designates an actual observation device; 83 designates an actual current observation section; 84 designates a power conversion circuit; 85 designates a second coordinate converter; 86 designates a first coordinate converter; 87 designates a current control section; 88 designates a machine control section; 89 designates a first speed estimation section; 90 designates a second speed estimation section; and 91 designates a differentiator.

BEST MODES FOR CARRYING OUT THE INVENTION

In relation to the invention intended for achieving the first objective, first through sixth embodiments (FIGS. 1 through 6) are described. In relation to the invention intended for achieving the second objective, seventh and eighth embodiments (FIGS. 8 and 9) are described.

First, a method and apparatus for controlling an electric current of a synchronous motor according to a first embodiment of the invention will be described by reference to FIG. 1.

The current controller of the synchronous motor hereinafter corresponds to an embodiment of a method for controlling a synchronous motor.

As shown in FIG. 1, in the current controller of the synchronous motor according to the embodiment, a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of the synchronous motor 1 coincide with a d-axis current command Idref and a q-axis current command Iqref, and the controller comprises: an actual position observation device 2 for providing an actual position θ of the synchronous motor; an actual current observation section 3 which observes a current of two phases or more of the synchronous motor and provides actual currents Iu, Iv, and Iw; a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; a current observer 10a which estimates a d-axis simulated current Idob and a q-axis simulated current Iqob on the basis of the d-axis actual current Idfb, the q-axis actual current Iqfb, a d-axis actual voltage command Vdref, and a q-axis actual voltage command Vqref; a feedback control section 9a which produces the d-axis actual voltage command Vdref and the q-axis actual voltage command Vqref on the basis of the d-axis current command Idref, the q-axis current command Iqref, the d-axis simulated current Idob, and the q-axis simulated current Iqob; and a first coordinate converter 5 for converting the d-axis actual voltage command Vdref and the q-axis actual voltage command Vqref into the actual voltage commands Vuref, Vvref, and Vwref on the basis of an actual position θ of a rotor of the synchronous motor.

The synchronous motor 1, the actual position observation device 2, the actual current observation section 3, the power conversion circuit 4, the first coordinate converter 5, and the second coordinate converter 6 are identical with related-art devices.

The current observer 10a generates the d-axis simulated current Idob and the q-axis simulated current Iqob in the following manner. Here, "s" designates a differential operator; Rd designates d-axis equivalent resistance; Rq designates q-axis equivalent resistance; Ld designates d-axis equivalent inductance; and Lq designates q-axis equivalent inductance. Ld1, Ld2, Lq1, and Lq2 designate gains of the current observer that should be set in a pole assignment.

$$Idob^*s=-Rd^*Idob/Ld+Ld1^*(Idfb-Idob)+(Vdob+Vdref)/Ld \quad (1)$$

$$Vdob^*s=Ld2^*(Idfb-Idob) \quad (2)$$

$$Iqob^*s=-Rq^*Iqob/Lq+Lq1^*(Iqfb-Iqob)+(Vqob+Vqref)/Lq \quad (3)$$

$$Vqob^*s=Lq2^*(Iqfb-Iqob) \quad (4)$$

The feedback control section 9a produces the d-axis actual voltage command Vdref and the q-axis actual voltage command Vqref in the following manner, where kda and kqa designate feedback gains.

$$Vdref=kda^*(Idref-Idob) \quad (5)$$

$$Vqref=kqa^*(Iqref-Iqob) \quad (6)$$

According to the current controller of the synchronous motor of the first embodiment, feedback control is performed by use of the d-axis simulated current Idob and the q-axis simulated current Iqob, both being produced by the current observer section 1a, in place of measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained.

Here, the feedback control section 9a may be configured by means of proportional/integral control rather than proportional control represented by Equations (5), (6). Moreover, the current observer 10a may be configured in consideration of interference components of the d, q axes.

A current controller of a synchronous motor according to a second embodiment of the invention will be described by reference to FIG. 2.

Figure 2:
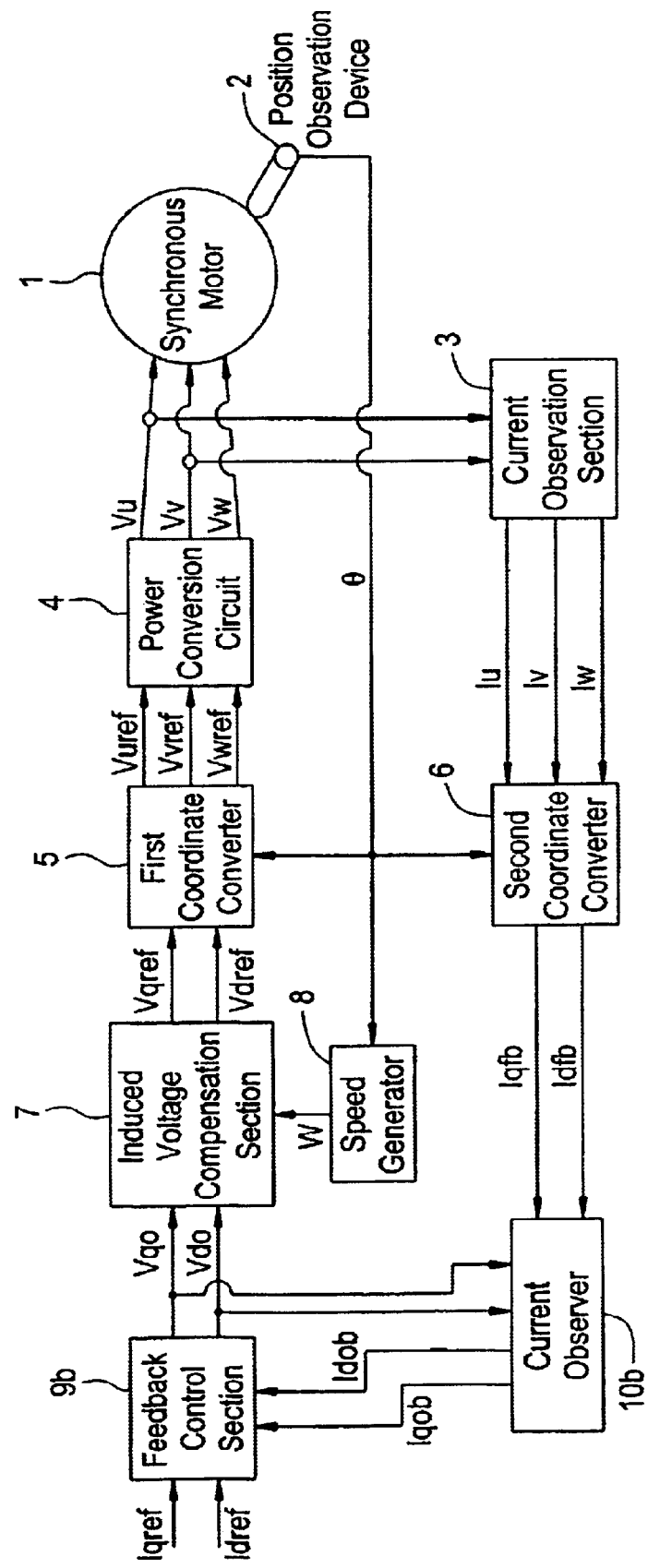
FIG. 2 is a block diagram showing the configuration of a current controller of a synchronous motor according to a second embodiment of the invention.

As shown in FIG. 2, in the current controller of the synchronous motor according to the embodiment, the power conversion circuit 4 is provided with the actual voltage commands Vuref, Vvref, and Vwref such that the d-axis actual current Idfb and the q-axis actual current Iqfb on the rotational coordinate axes which rotate synchronously with the rotor magnetic flux vector of the synchronous motor 1 coincide with the d-axis current command Idref and the q-axis current command Iqref, and the controller comprises: the actual position observation device 2 for providing an actual position θ of the synchronous motor; the actual current observation section 3 which observes a current of two phases or more of the synchronous motor and provides actual currents Iu, Iv, and Iw; the second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; the current observer 10b which estimates the d-axis simulated current Idob and the q-axis simulated current Iqob on the basis of the d-axis actual current Idfb, the q-axis actual current Iqfb, a d-axis first simulated voltage command Vdo, and a q-axis first simulated voltage command Vqo; the current feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob; the speed generator 8 for producing an actual speed "w" on the basis of the actual position θ; an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w;" to thereby produce the d-axis actual voltage command Vdref and the q-axis actual voltage command Vqref; and the first coordinate converter 5 for converting the d-axis actual voltage command Vdref and the q-axis actual voltage command Vqref into the actual voltage commands Vuref, Vvref, and Vwref on the basis of the actual position θ.

The current observer 10b generates the d-axis simulated current Idob and the q-axis simulated current Iqob as follows.

$$Idob^*s=-Rd^*Idob/Ld+Ld1^*(Idfb-Idob)+(Vdob+Vdo)/Ld \quad (7)$$

$$Vdob^*s=Ld2^*(Idfb-Idob) \quad (8)$$

$$Iqob^*s=-Rq^*Iqob/Lq+Lq1^*(Iqfb-Iqob)+(Vqob+Vqo)/Lq \quad (9)$$

$$Vqob^*s=Lq2^*(Iqfb-Iqob) \quad (10)$$

The feedback control section 9b produces the d-axis first simulated voltage command Vdo and the q-axis first simulated voltage command Vqo in the following manner, where kda and kqa designate feedback gains.

$$Vdo=kda^*(Idref-Idob) \quad (11)$$

$$Vqo=kqa^*(Iqref-Iqob) \quad (12)$$

The speed generator 8 generates the actual speed "w" as follows.

$$w=s^*\theta \quad (13)$$

The induced voltage compensation section 7 produces the d-axis actual voltage command Vdref and the q-axis voltage command Vqref as follows, where φd represents a d-axis equivalent magnetic flux coefficient, and φq represents a q-axis equivalent magnetic flux coefficient.

$$Vdref=d^*w \quad (14)$$

$$Vqref=Vqo+\phi q^*w \quad (15)$$

According to the current controller of the synchronous motor of the second embodiment, feedback control is performed by use of the d-axis simulated current Idob and the q-axis simulated current Iqob, both being produced by the current observer section 10b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. Further, when an abrupt change arises in the rotational speed of the synchronous motor, estimation errors in the d-axis simulated current Idob and the q-axis simulated current Iqob, both being produced by the current observer section 10b, are suppressed by compensating for the induced voltage on the basis of the induced voltage compensation section 7. Accordingly, even when an abrupt change arises in the rotational speed of the synchronous motor, a superior current response characteristic can be obtained.

Here, the feedback control section 9b may be configured by means of proportional/integral control rather than proportional control represented by Equations (11), (12).

Moreover, the current observer 10b may be configured in consideration of interference components of the d, q axes.

A current controller of a synchronous motor according to a third embodiment of the invention will be described by reference to FIG. 3.

Figure 3:
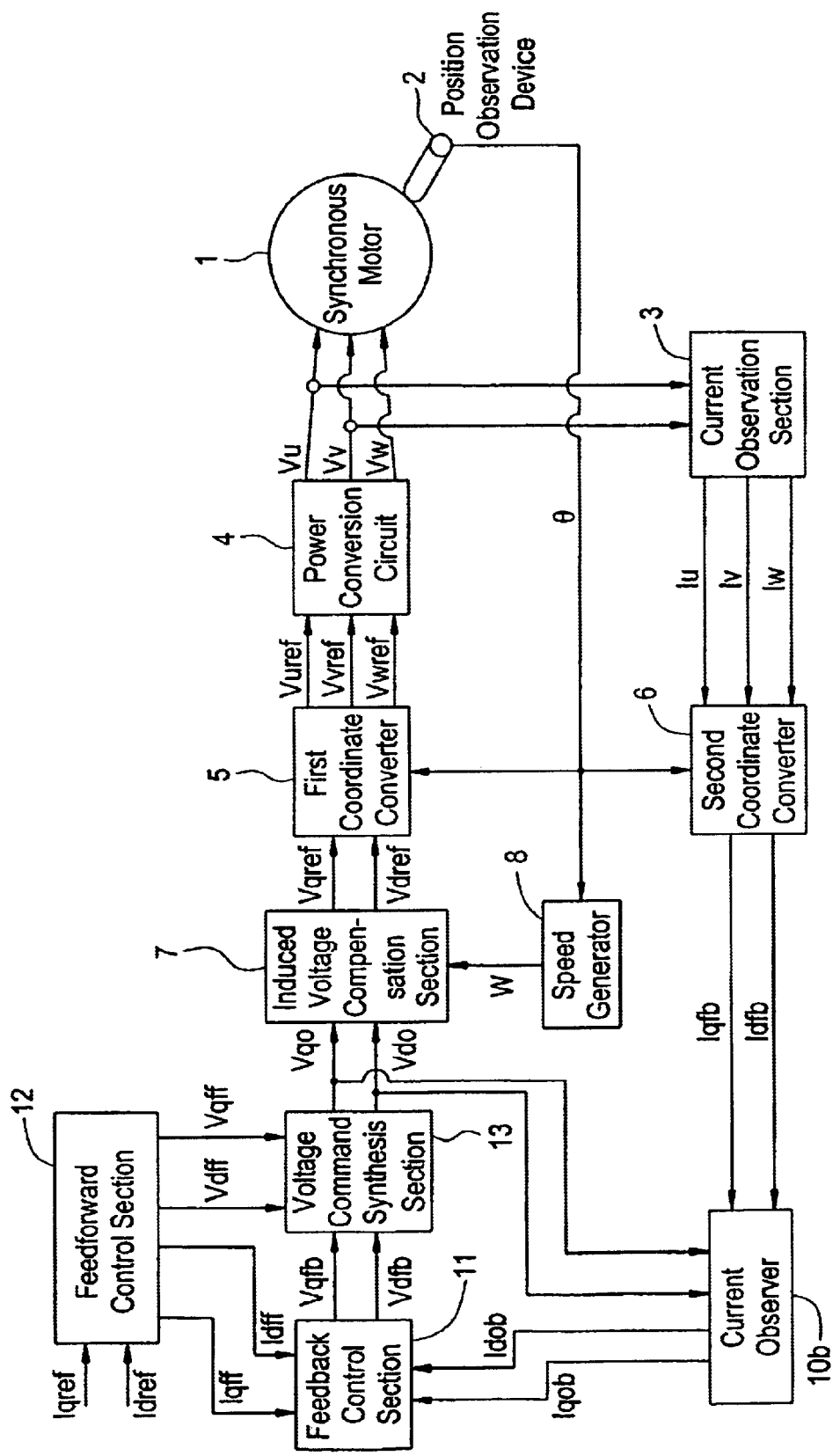
FIG. 3 is a block diagram showing the configuration of a current controller of a synchronous motor according to a third embodiment of the invention.

As shown in FIG. 3, in the current controller of the synchronous motor according to the embodiment, the power conversion circuit 4 is provided with the voltage commands Vuref, Vvref, and Vwref such that the d-axis actual current Idfb and the q-axis actual current Iqfb on the rotational coordinate axes which rotate synchronously with the rotor magnetic flux vector of the synchronous motor 1 coincide with the d-axis current command Idref and the q-axis current command Iqref, and the controller comprises: the actual position observation device 2 for providing an actual position θ of the synchronous motor; the actual current observation section 3 which observes a current of two phases or more of the synchronous motor and provides actual currents Iu, Iv, and Iw; the second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; the current observer 10b which estimates the d-axis simulated current Idob and the q-axis simulated current Iqob on the basis of the d-axis actual current Idfb, the q-axis actual current Iqfb, the d-axis first simulated voltage command Vdo, and the q-axis first simulated voltage command Vqo; a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref; a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob; a voltage command synthesizer 13 which produces the d-axis first simulated voltage command Vdo and the q-axis first simulated voltage command Vqo on the basis of the d-axis third simulated voltage command Vdfb, the q-axis third simulated voltage command Vqfb, the d-axis second simulated voltage command Vdff, and the q-axis second simulated voltage command Vqff; a current feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob; the speed generator 8 for producing the actual speed "w" on the basis of the actual position θ; the induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and the first coordinate converter 5 for converting the d-axis actual voltage command Vdref and the q-axis actual voltage command Vqref into the actual voltage commands Vuref, Vvref, and Vwref on the basis of the actual position θ.

The feedforward control section 12 produces the d-axis simulated current command Idff, the q-axis second simulated current command Iqff, the d-axis second simulated voltage command Vdff, and the q-axis second simulated voltage command Vqff in the following manner. Here, kdf, Kqf denote control gains of the feedforward control section 12.

$$Idff*s = -Rd*Idff/Ld + Vdff \quad (16)$$

$$Vdff = Kdf*(Idref - Idff) \quad (17)$$

$$Iqff*s = -Rq*Iqff/Lq + Vqff \quad (18)$$

$$Vqff = Kqf*(Iqref - Iqff) \quad (19)$$

The feedback control section 11 produces the d-axis third simulated voltage command Vdfb and the q-axis third simulated voltage command Vqfb in the following manner.

$$Vdfb = kda*(Idff - Idob) \quad (20)$$

$$Vqfb = kqa*(Iqff - Iqob) \quad (21)$$

The voltage command synthesizer 13 produces the d-axis first simulated voltage command Vdo and the q-axis first simulated voltage command Vqo in the following manner.

$$Vdo = Vdfb + Vdff \quad (22)$$

$$Vqo = Vqfb + Vqff \quad (23)$$

According to the current controller of the synchronous motor of the third embodiment, feedback control is performed by use of the d-axis simulated current Idob and the q-axis simulated current Iqob, both being produced by the current observer section 10b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. Further, when an abrupt change arises in the rotational speed of the synchronous motor, estimation errors in the d-axis simulated current Idob and the q-axis simulated current Iqob, both being produced by the current observer section 10a, can be suppressed by compensating for the induced voltage on the basis of the induced voltage compensation section 7. Accordingly, even when an abrupt change arises in the rotational speed of the synchronous motor, a superior current response characteristic can be obtained. Still further, a faster current response characteristic in response to the command can be obtained, by inputting the d-axis second simulated voltage command Vdff and the q-axis second simulated voltage command Vqff, both being produced by the feedforward control section 12, directly to the voltage command synthesizer 13.

Here, the feedback control section 11 may be configured by means of proportional/integral control rather than proportional control represented by Equations (20), (21).

A current controller of a synchronous motor according to a fourth embodiment of the invention will be described by reference to FIG. 4.

Figure 4:
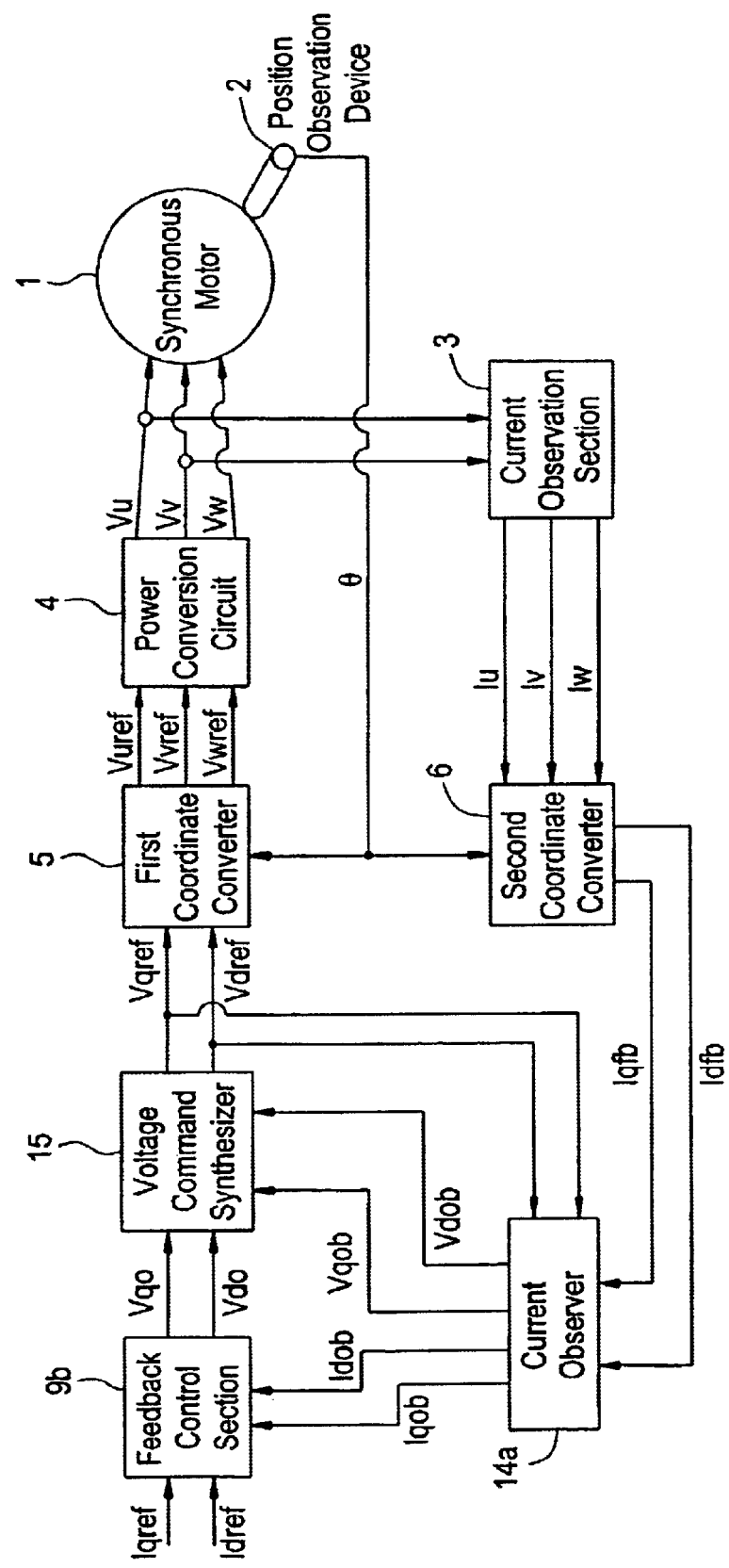
FIG. 4 is a block diagram showing the configuration of a current controller of a synchronous motor according to a fourth embodiment of the invention.

As shown in FIG. 4, in the current controller of the synchronous motor according to the embodiment, the power conversion circuit 4 is provided with the actual voltage commands Vuref, Vvref, and Vwref such that the d-axis actual current Idfb and the q-axis actual current Iqfb on the rotational coordinate axes which rotate synchronously with the rotor magnetic flux vector of the synchronous motor 1 coincide with the d-axis current command Idref and the q-axis current command Iqref, and the controller comprises: the actual position observation device 2 for providing an actual position θ of the synchronous motor; the actual current observation section 3 which observes a current of two phases or more of the synchronous motor and provides actual currents Iu, Iv, and Iw; the second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; the current observer 14a which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, the d-axis actual voltage command Vdref, and the q-axis actual voltage command Vqref; the feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob; the voltage command synthesizer 15 which produces the d-axis actual voltage command Vdref and the q-axis actual voltage command Vqref on the basis of the d-axis third simulated voltage command Vdfb, the q-axis third simulated voltage command Vqfb, the d-axis simulated disturbance voltage Vdob; and the q-axis simulated disturbance voltage Vqob; and the first coordinate converter 5 for converting the d-axis actual voltage command Vdref and the q-axis actual voltage command Vqref into the actual voltage commands Vuref, Vvref, and Vwref on the basis of the actual position θ.

The current observer 14a generates the d-axis simulated current Idob, the q-axis simulated current Iqob, the d-axis simulated disturbance voltage Vdob, and the q-axis simulated disturbance voltage Vqob as follows.

$$Idob^*s=-Rd^*Idob/Ld+Ld1^*(Idfb-Idob)+(Vdob+Vdref)/Ld \quad (24)$$

$$Vdob^*s=Ld2^*(Idfb-Idob) \quad (25)$$

$$Iqob^*s=-Rq^*Iqob/Lq+Lq1^*(Iqfb-Iqob)+(Vqob+Vqref)/Lq \quad (26)$$

$$Vqob^*s=Lq2^*(Iqfb-Iqob) \quad (27)$$

The voltage command synthesizer 15 produces the d-axis actual voltage command Vdref and the q-axis actual voltage command Vqref as follows:

$$Vdref=Vdob+Vdo \quad (28)$$

$$Vqref=Vqob+Vqo \quad (29)$$

According to the current controller of the synchronous motor of the fourth embodiment, feedback control is performed by use of the d-axis simulated current Idob and the q-axis simulated current Iqob, both being produced by the current observer section 14a, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. A disturbance voltage component can be compensated by inputting the d-axis simulated disturbance voltage Vdob and the q-axis simulated disturbance voltage Vqob, both being produced by the current observer section 14a, directly to the voltage command synthesizer 15. Accordingly, even when abrupt changes have arisen in parameters or power of the synchronous motor 1 and the power conversion circuit 4, a superior current response characteristic can be obtained. Further, the current observer 14a maybe constructed in consideration of the d-axis and q-axis interference components.

A current controller of a synchronous motor according to a fifth embodiment of the invention will be described by reference to FIG. 5.

Figure 5:
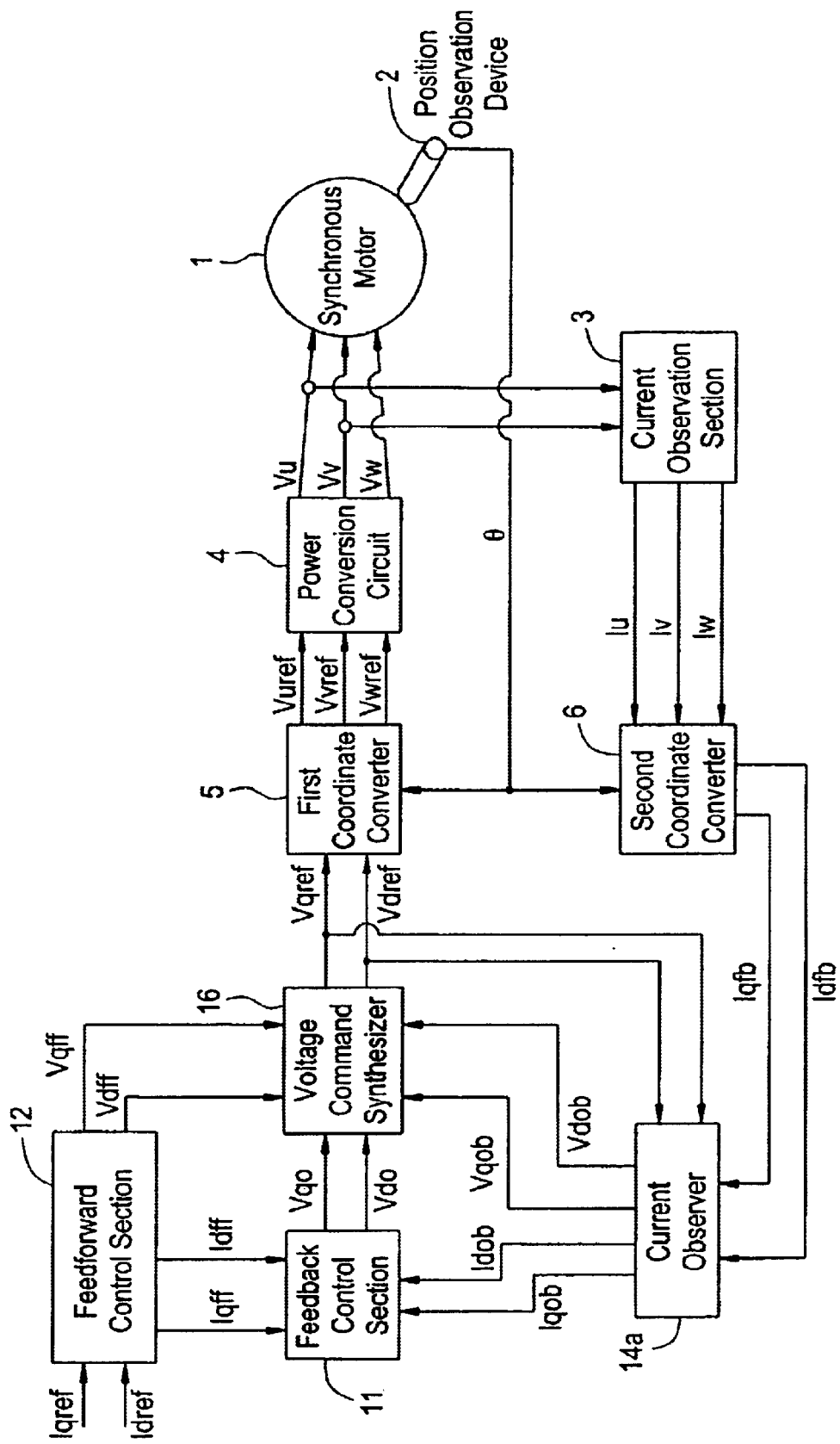
FIG. 5 is a block diagram showing the configuration of a current controller of a synchronous motor according to a fifth embodiment of the invention.

As shown in FIG. 5, in the current controller of the synchronous motor according to the embodiment, the power conversion circuit 4 is provided with the actual voltage commands Vuref, Vvref, and Vwref such that the d-axis actual current Idfb and the q-axis actual current Iqfb on the rotational coordinate axes which rotate synchronously with the rotor magnetic flux vector of the synchronous motor 1 coincide with the d-axis-current command Idref and the q-axis current command Iqref, and the controller comprises: the actual position observation device 2 for providing an actual position θ of the synchronous motor; the actual current observation section 3 which observes a current of two phases or more of the synchronous motor and provides actual currents Iu, Iv, and Iw; the second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; the feedforward control section 12 which produces the d-axis second simulated current command Idff, the q-axis second simulated current command Iqff, the d-axis second simulated voltage command Vdff, and the q-axis second simulated voltage command Vqff on the basis of the d-axis current command Idref and the q-axis current command Iqref; the current observer 14a which estimates the d-axis simulated current Idob, the q-axis simulated current Iqob, the d-axis simulated disturbance voltage Vdob, and the q-axis simulated disturbance voltage Vqob on the basis of the d-axis actual current Idfb, the q-axis actual current Iqfb, the d-axis actual voltage command Vdref, and the q-axis actual voltage command Vqref; the feedback control section 11 which produces the d-axis third simulated voltage command Vdfb and the q-axis third simulated voltage command Vqfb on the basis of the d-axis second simulated current command Idff, the q-axis second simulated current command Iqff, the d-axis simulated current Idob, and the q-axis simulated current Iqob; the voltage command synthesizer 16 which produces the d-axis actual voltage command Vdref and the q-axis actual voltage command Vqref on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; and the first coordinate converter 5 for converting the d-axis actual voltage command Vdref and the q-axis actual voltage command Vqref into the actual voltage commands Vuref, Vvref, and Vwref on the basis of the actual position θ.

The voltage command synthesizer 16 produces the d-axis actual voltage command Vdref and the q-axis actual voltage command Vqref as follows.

$$Vdref = Vdob + Vdfb + Vdff \tag{30}$$

$$Vqref = Vqob + Vqfb + Vqff \tag{31}$$

According to the current controller of the synchronous motor of the fifth embodiment, feedback control is performed by use of the d-axis simulated current Idob and the q-axis simulated current Iqob, both being produced by the current observer section 14a, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. A disturbance voltage component can be compensated by inputting the d-axis simulated disturbance voltage Vdob and the q-axis simulated disturbance voltage Vqob, both being produced by the current observer section 14a, directly to the voltage command synthesizer 16. Accordingly, even when abrupt changes have arisen in parameters or power of the synchronous motor 1 and the power conversion circuit 4, a superior current response characteristic can be obtained. Moreover, the d-axis second simulated voltage command Vdff and the q-axis second simulated voltage command Vqff, both being produced by the feedforward control section 12, are input directly to the voltage command synthesizer 16, thereby providing a faster current response characteristic in response to the command.

A current controller of a synchronous motor according to a sixth embodiment of the invention will be described by reference to FIG. 6.

Figure 6:
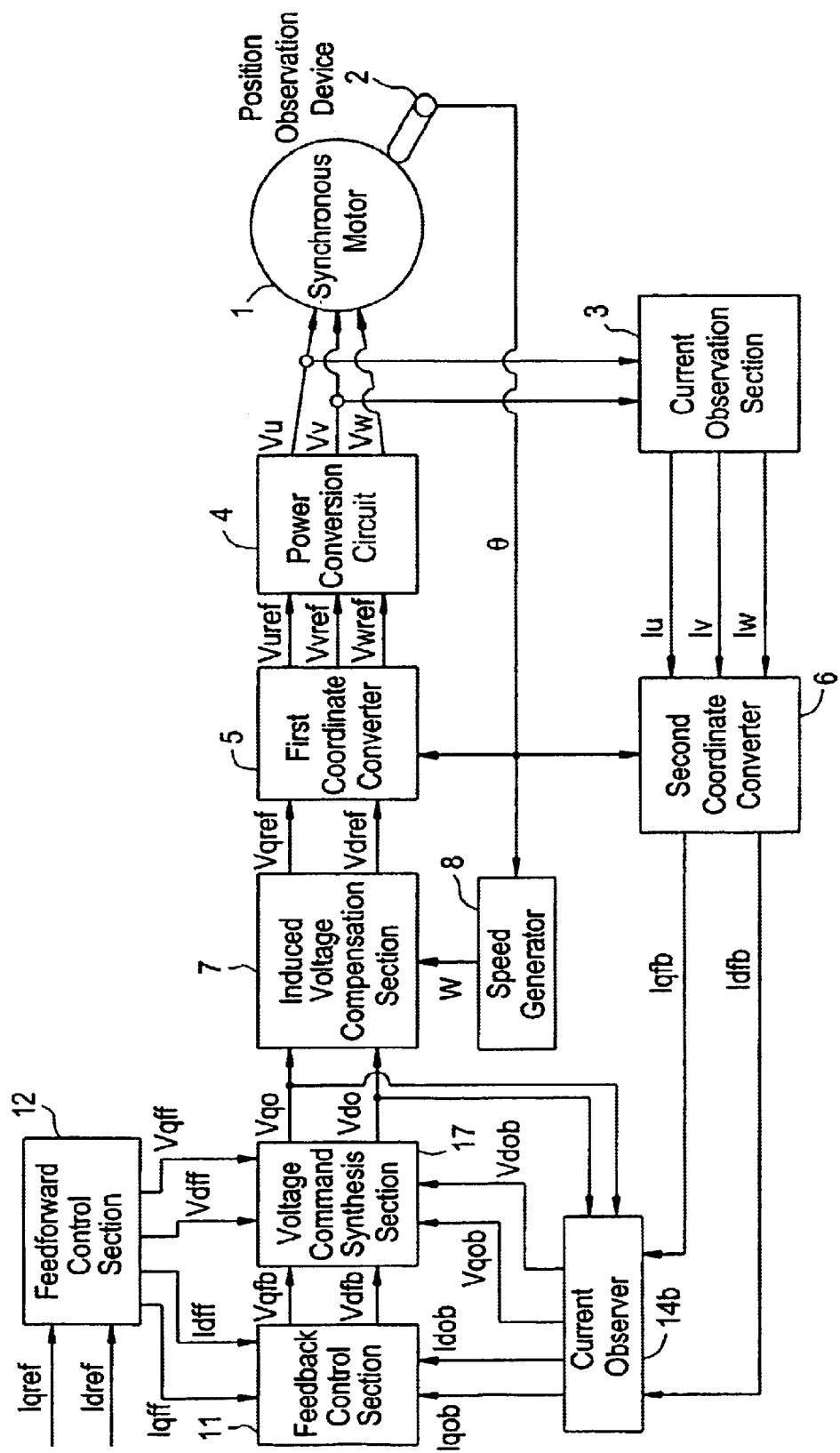
FIG. 6 is a block diagram showing the configuration of a current controller of a synchronous motor according to a sixth embodiment of the invention.
Figure 7:
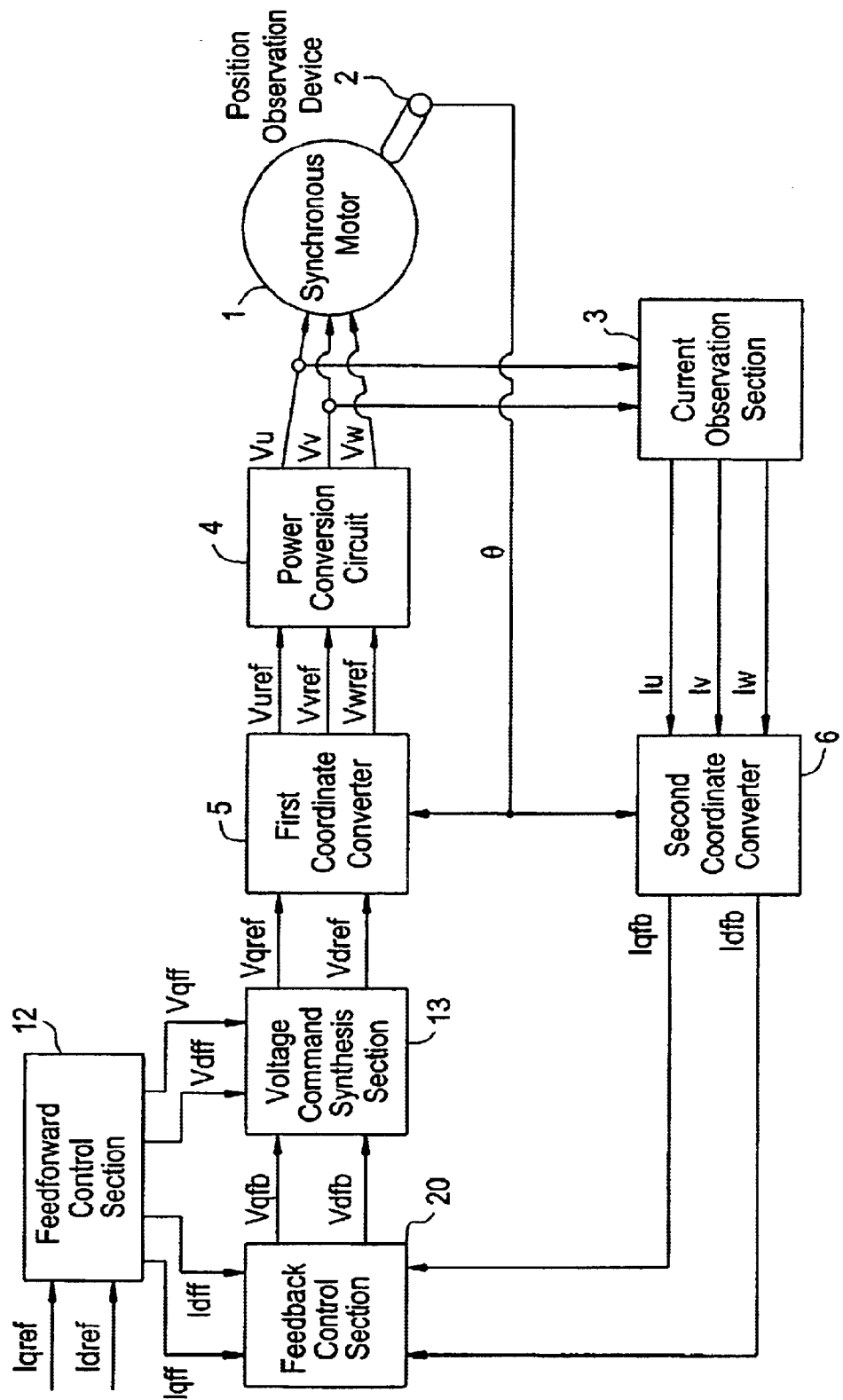
FIG. 7 is a block diagram showing the configuration of a related-art motor controller.

As shown in FIG. 6, in the current controller of the synchronous motor according to the embodiment, the power conversion circuit 4 is provided with the actual voltage commands Vuref, Vvref, and Vwref such that the d-axis actual current Idfb and the q-axis actual current Iqfb on the rotational coordinate axes which rotate synchronously with the rotor magnetic flux vector of the synchronous motor 1 coincide with the d-axis current command Idref and the q-axis current command Iqref, and the controller comprises: the actual position observation device 2 for providing an actual position θ of the synchronous motor; the actual current observation section 3 which observes a current of two phases or more of the synchronous motor and provides actual currents Iu, Iv, and Iw; the second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor; the feedforward control section 12 which produces the d-axis second simulated current command Idff, the q-axis second simulated current command Iqff, the d-axis second simulated voltage command Vdff, and the q-axis second simulated voltage command Vqff on the basis of the d-axis current command Idref and the q-axis current command Iqref; the current observer 14b which estimates the d-axis simulated current Idob, the q-axis simulated current Iqob, the d-axis simulated disturbance voltage Vdob, and the q-axis simulated disturbance voltage Vqob on the basis of the d-axis actual current Idfb, the q-axis actual current Iqfb, the d-axis first simulated voltage command Vdo, and the q-axis actual voltage command Vqo; the feedback control section 11 which produces the d-axis third simulated voltage command Vdfb, the q-axis third simulated voltage command Vqfb, the d-axis simulated disturbance voltage Vdob, and the q-axis simulated disturbance voltage Vqob on the basis of the d-axis second simulated current command Idff, the q-axis second simulated current command Iqff, the d-axis simulated current Idob, and the q-axis simulated current Iqob; a voltage command synthesizer 17 which produces the d-axis first simulated voltage command Vdo and the q-axis first simulated voltage command Vqo on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; the speed generator 8 for producing the actual speed "w" on the basis of the actual position θ; the induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and the first coordinate converter 5 for converting the d-axis actual voltage command Vdref and the q-axis actual voltage command Vqref into the actual voltage commands Vuref, Vvref, and Vwref on the basis of the actual position θ.

The current observer 14b generates the d-axis simulated current Idob, the q-axis simulated current Iqob, the d-axis simulated disturbance voltage Vdob, and the q-axis simulated disturbance voltage Vqob as follows.

$$Idob^*s = -Rd^*Idob/Ld + Ld1^*(Idfb - Idob) + (Vdob + Vdo)/Ld \tag{32}$$

$$Vdob^*s = Ld2^*(Idfb - Idob) \tag{33}$$

$$Iqob^*s = -Rq^*Iqob/Lq + Lq1^*(Iqfb - Iqob) + (Vqob + Vqo)/Lq \tag{34}$$

$$Vqob^*s = Lq2^*(Iqfb - Iqob) \tag{35}$$

The voltage command synthesizer 17 produces the d-axis actual voltage command Vdref and the actual voltage command Vqref as follows:

$$Vdo = Vdff + Vdfb + Vdob \tag{36}$$

$$Vqo = Vqff + Vqfb + Vqob \tag{37}.$$

According to the current controller of the synchronous motor of the sixth embodiment, feedback control is performed by use of the d-axis simulated current Idob and the q-axis simulated current Iqob, both being produced by the current observer section 14b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. A disturbance voltage component can be compensated by inputting the d-axis simulated disturbance voltage Vdob and the q-axis simulated disturbance voltage Vqob, both being produced by the current observer section 14b, directly to the voltage command synthesizer 15. Accordingly, even when abrupt changes have arisen in parameters or power of the synchronous motor 1 and the power conversion circuit 4, a superior current response characteristic can be obtained. Further, a faster current response characteristic in response to the command can be obtained, by inputting the d-axis second simulated voltage command Vdff and the q-axis second simulated voltage command Vqff, both being produced by the feedforward control section 12, directly to the voltage command synthesizer 16. Moreover, when abrupt changes have arisen in the rotational speed of the synchronous motor, an estimation error in the d-axis simulated current Idob and that in the q-axis simulated current Iqob, both being produced by the current observer section 14b, are suppressed by compensating for the induced voltage by means of the induced voltage compensation section 7. As a result, even when an abrupt change has arisen in the rotational speed of the synchronous motor, a superior current response characteristic can be obtained. Further, the current observer 14b may be constructed in consideration of the d-axis interference component and the q-axis interference component.

An apparatus and method for controlling a synchronous motor according to a seventh embodiment of the invention will be described by reference to FIG. 8. Hereinbelow, the controller of the synchronous motor is one embodiment of the method for controlling a synchronous motor.

Figure 8:
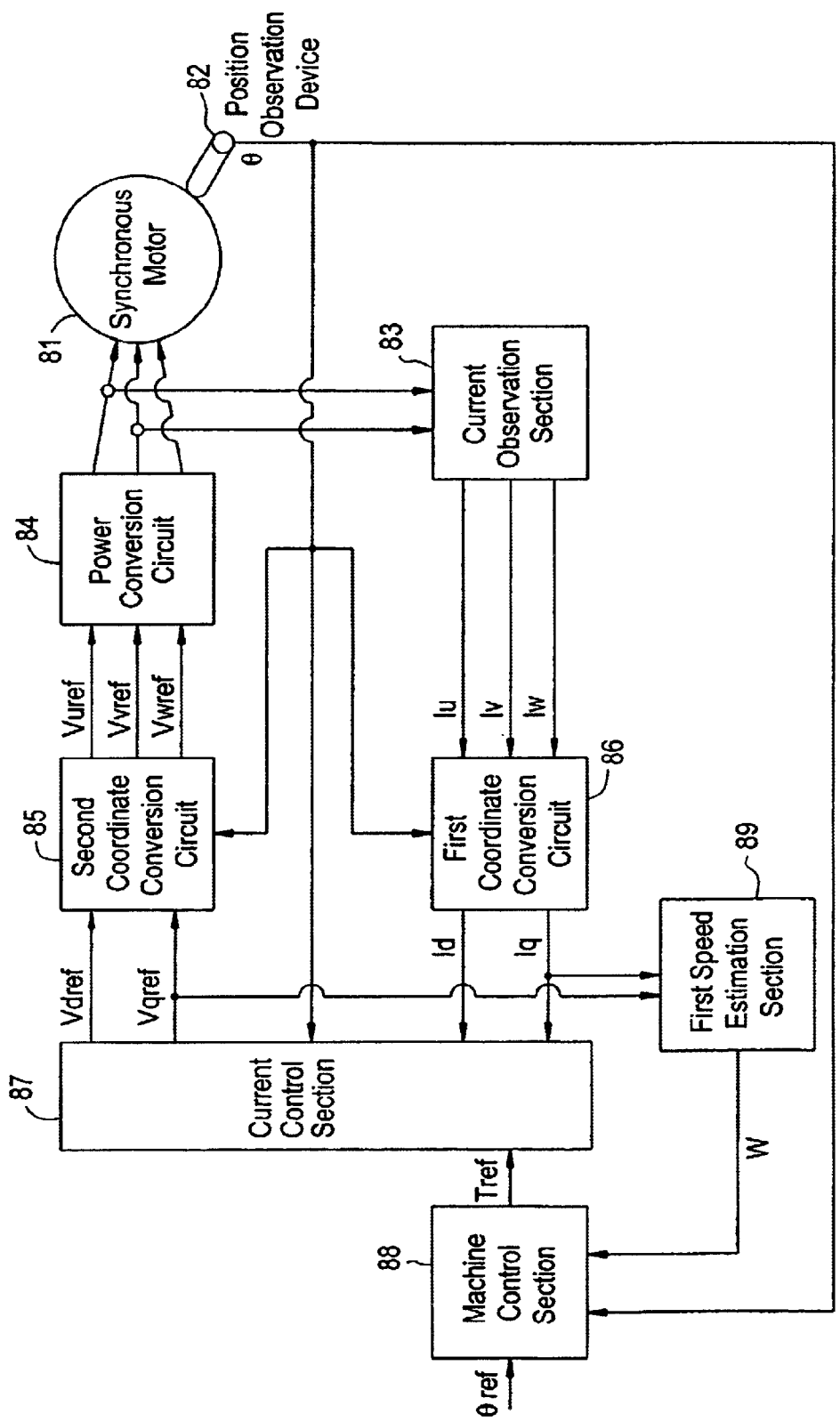
FIG. 8 is a block diagram showing the configuration of a current controller of a synchronous motor according to a seventh embodiment of the invention.

As shown in FIG. 8, in the current controller of the synchronous motor according to the embodiment, a power conversion circuit 84 is provided with appropriate actual voltage commands Vuref, Vvref, and Vwref such that a synchronous motor 81 fed with power from the power conversion circuit 84 approaches an actual command θref, and the controller comprises: an actual position observation device 82 for providing an actual position θ of the synchronous motor 81; an actual current observation section 83 which observes a current of two phases or more of the synchronous motor 81 and provides actual currents Iu, Iv, and Iw; a first coordinate conversion circuit 86 which converts, on the basis of the actual position θ, the actual currents Iu, Iv, and Iw into a d-axis actual current Id and a q-axis actual current Iq on the rotational coordinate axes which rotate synchronously with the rotor magnetic flux vector of the synchronous motor; a machine control section 88 which performs machine control operation, to thereby provide a torque command Tref on the basis of the actual command θref, the actual position θ of a rotor of the synchronous motor, and an estimated speed "w"; a current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref; a second coordinate conversion circuit 85 which provides the actual voltage commands Vuref, Vvref, and Vwref on the basis of the actual position θ, the d-axis voltage command Vdref, and the q-axis voltage command Vqref; and a first speed estimation section 89 for estimating the estimated speed "w" on the basis of the q-axis actual current Iq and the q-axis voltage command Vqref.

The synchronous motor 81, the actual position observation device 82, the actual current observation section 83, the power conversion circuit 84, the second coordinate converter 85, the first coordinate conversion circuit 86, the current control section 87, and the machine control section 88 are identical with related-art devices.

The first speed estimation section 89 produces the estimated speed "w" as follows:

Here, "s" designates a differential operator; Rq designates q-axis equivalent resistance; and Lq designates q-axis equivalent inductance. Lq1, Lq2 designate gains of the current observer which should be set in a pole assignment, where Iqob is a q-axis estimated current, and Vqob is a q-axis estimated voltage disturbance.

$$Iqob^*s = -Rq^*Iqob/Lq + Lq1^*(Iq-Iqob) + (Vqob+Vqref)/Lq \qquad (38)$$

$$Vqob^*s = Lq2^*(Iqfb-Iqob) \qquad (39)$$

$$w = -Vqob/\phi \qquad (40)$$

According to the current controller of the synchronous motor of the seventh embodiment, the first speed estimation section 89 estimates the estimated speed "w" in place of the differentiator 91 on the basis of the q-axis actual current Iq and the q-axis voltage command Vqref. Therefore, accuracy of the estimated speed "w" does not depend directly on the resolution of the actual position θ.

Accordingly, even when the sampling time is shortened, superior readiness and superior robustness can be obtained without involvement of an increase in the resolving power of an encoder.

Figure 9:
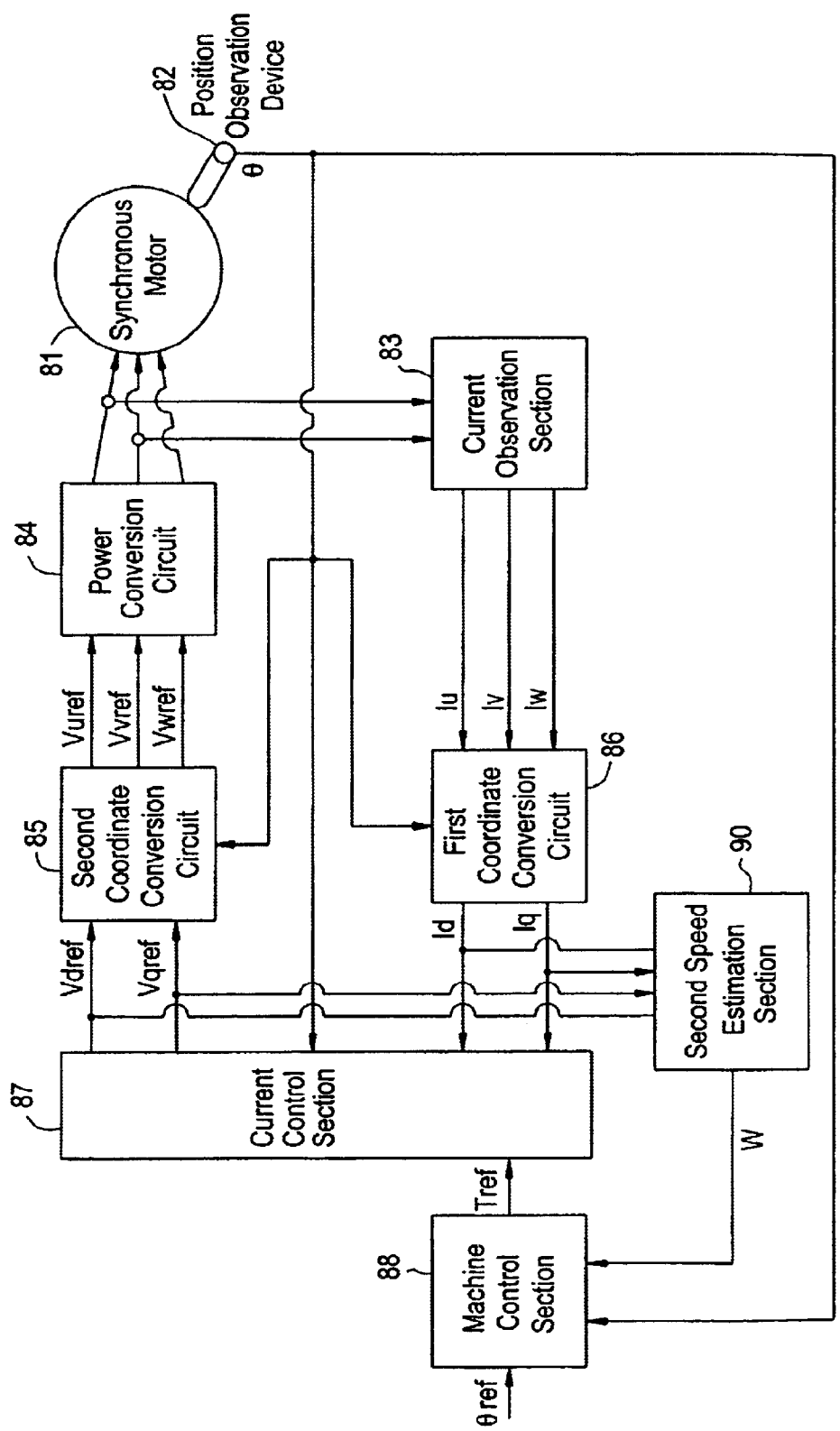
FIG. 9 is a block diagram showing the configuration of a current controller of a synchronous motor according to an eighth embodiment of the invention.
Figure 10:
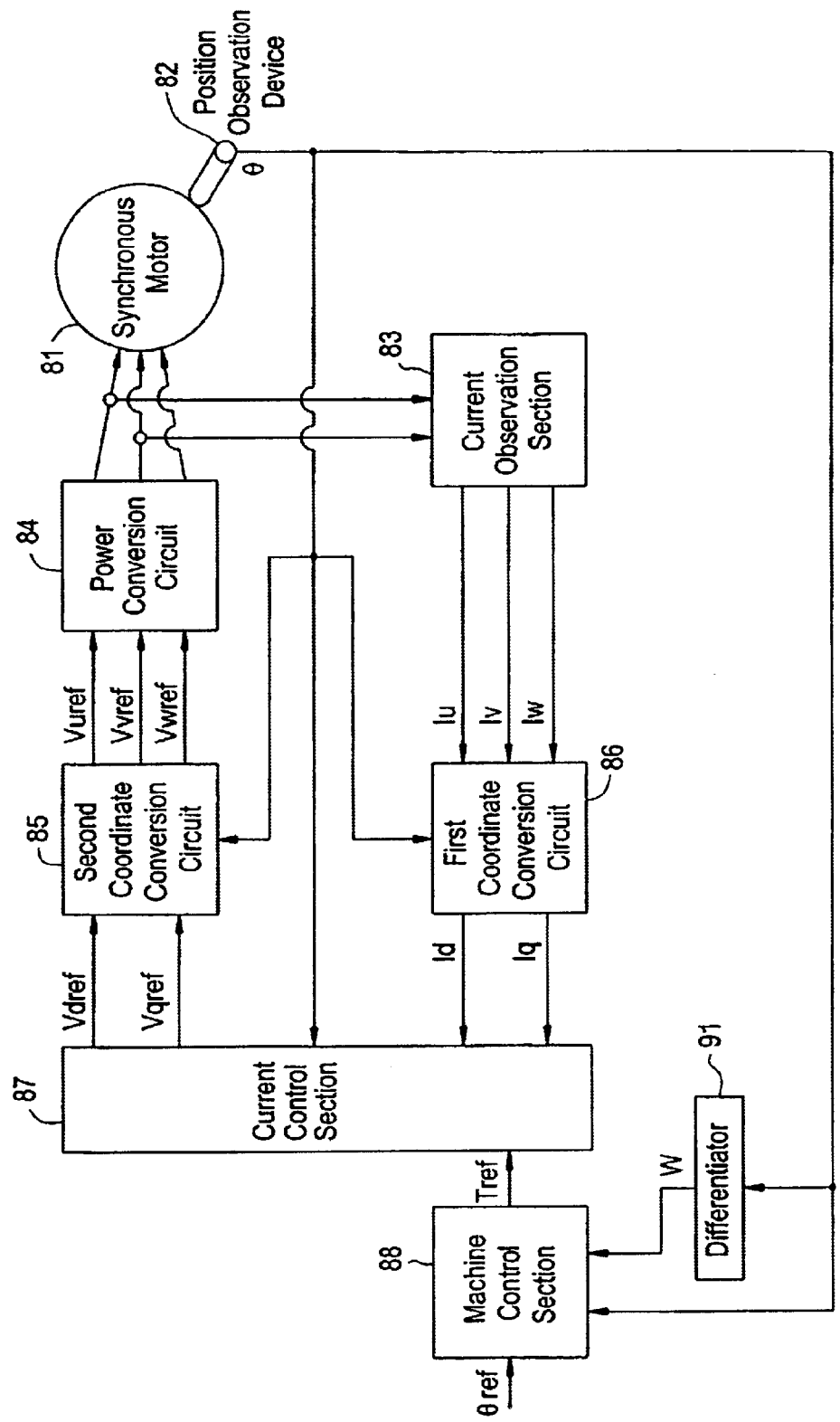
FIG. 10 is a block diagram showing the configuration of a motor controller of a related-art synchronous motor.

An apparatus and method for controlling a synchronous motor according to an eight embodiment of the invention will be described by reference to FIG. 9. Hereinbelow, the controller of the synchronous motor is one embodiment of the method for controlling a synchronous motor. As shown in FIG. 9, in the current controller of the synchronous motor according to the embodiment, the power conversion circuit 84 is provided with appropriate actual voltage commands Vuref, Vvref, and Vwref such that the synchronous motor 81 fed with power from the power conversion circuit 84 approaches an actual command θref, and the controller comprises: the actual position observation device 82 for providing an actual position θ of the synchronous motor 81; the actual current observation section 83 which observes a current of two phases or more of the synchronous motor 81 and provides actual currents Iu, Iv, and Iw; the first coordinate conversion circuit 86 which converts, on the basis of the actual position θ, the actual currents Iu, Iv, and Iw into the d-axis actual current Id and the q-axis actual current Iq on the rotational coordinate axes which rotate synchronously with the rotor magnetic flux vector of the synchronous motor; the machine control section 88 which performs machine control operation, to thereby provide the torque command Tref on the basis of the actual command θref, the actual position θ of the rotor of the synchronous motor, and the estimated speed "w"; the current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref; the second coordinate conversion circuit 85 which provides the actual voltage commands Vuref, Vvref, and Vwref on the basis of the actual position θ, the d-axis voltage command Vdref, and the q-axis voltage command Vqref; and a second speed estimation section 90 for estimating the estimated speed "w" on the basis of the d-axis actual current Id, the q-axis actual current Iq, the d-axis voltage command Vdref, and the q-axis voltage command Vqref.

The second speed estimation section 90 produces the estimated speed "w" as follows.

Here, Rd designates d-axis equivalent resistance; and Ld designates d-axis equivalent inductance. Ld1, Ld2 designate gains of the current observer which should be set in a pole assignment, where Idob is a d-axis estimated current, and Vdob is a d-axis estimated voltage disturbance.

$$Idob^* s = -Rd^* Idob/Ld + Ld1^*(Id-Idob) - w^* Iqob^* Lq/Ld + (Vdref + Vdob)/Ld \quad (41)$$

$$Vdob^* s = Ld2^*(Id-Idob) \quad (42)$$

$$Iqob^* s = -Rq^* Iqob/Lq + Lq1^*(Iq-Iqob) + w^* Idob^* Ld/Lq + (Vqob + Vqref)/Lq \quad (43)$$

$$Vqob^* s = Lq2^*(Iq-Iqob) \quad (44)$$

$$w = -Vqob/\phi \quad (45)$$

According to the current controller of the synchronous motor of the eighth embodiment, the second speed estimation section 90 estimates the estimated speed "w" in place of the differentiator 91, on the basis of the d-axis actual current Id, the q-axis actual current Iq, the d-axis voltage command Vdref, and the q-axis voltage command Vqref. As a result, the accuracy of the estimated speed "w" does not depend directly on the resolution of the actual position θ. Accordingly, even when the sampling time is shortened, superior readiness and superior robustness can be obtained without involvement of an increase in the resolving power of an encoder. In addition, the second speed estimation section 90 becomes superior to the first speed estimation section 89 in terms of estimated accuracy of the estimated speed "w," and hence a control gain of the machine control section can be set to a high level.

Although the invention has been described in detail by reference to a specific embodiment, it is evident to a person skilled in the art that the invention is susceptible to various alterations and modifications without departing from the spirit and scope of the invention.

The present invention is based on Japanese Patent Application (JP-A-2001-203576) filed on Jul. 4th, 2001 and Japanese Patent Application (JP-A-2001-209395) filed on Jul. 10th, 2001, and their contents are incorporated herein by reference.

INDUSTRIAL APPLICABILITY

According to a method for controlling an electric current of a synchronous motor defined in claim 1, a current feedback gain can be set to a high level by suppressing noise in a d-axis actual current Idfb and that in a q-axis actual current Iqfb. Hence, even when variations arise in parameters or power of the synchronous motor 1 and the power conversion circuit 4 under the influence of temperature, a superior current response characteristic can be obtained.

According to a method for controlling an electric current of a synchronous motor defined in claim 2, a current feedback gain can be set to a high level by suppressing noise in a d-axis actual current Idfb and that in a q-axis actual current Iqfb. Hence, even when variations arise in parameters or power of the synchronous motor 1 and the power conversion circuit 4 under the influence of temperature, a superior current response characteristic can be obtained. Further, when an abrupt change has arisen in the rotational speed of the synchronous motor, a superior current response characteristic can be obtained by directly compensating for an induced voltage.

According to a method for controlling an electric current of a synchronous motor defined in claim 3, a current feedback gain can be set to a high level by suppressing noise in the d-axis actual current Idfb and that in the q-axis actual current Iqfb. Hence, even when variations arise in parameters or power of the synchronous motor 1 and the power conversion circuit 4 under the influence of temperature, a superior current response characteristic can be obtained. Further, when an abrupt change has arisen in the rotational speed of the synchronous motor, a superior current response characteristic can be obtained by directly compensating for an induced voltage. Moreover, a faster current response characteristic in response to the command can be-obtained by directly compensating for a d-axis second simulated voltage command Vdff and the q-axis second simulated voltage command Vqff.

According to a method for controlling an electric current of a synchronous motor defined in claim 4, a current feedback gain can be set to a high level by suppressing noise in the d-axis actual current Idfb and that in the q-axis actual current Iqfb. Hence, even when variations arise in parameters or power of the synchronous motor 1 and the power conversion circuit 4 under the influence of temperature, a superior current response characteristic can be obtained. Further, when an abrupt change or fluctuation has arisen in a parameter of the synchronous motor 1 and that of the power conversion circuit 4, a superior current response characteristic can be obtained by directly compensating for a d-axis simulated disturbance voltage Vdob and a q-axis simulated disturbance voltage Vqob.

According to a method for controlling an electric current of a synchronous motor defined in claim 5, a current feedback gain can be set to a high level by suppressing noise in the d-axis actual current Idfb and that in the q-axis actual current Iqfb. Hence, even when variations arise in parameters or power of the synchronous motor 1 and the power conversion circuit 4 under the influence of temperature, a superior current response characteristic can be obtained. Further, when an abrupt change or fluctuation has arisen in a parameter of the synchronous motor 1 and that-of the power conversion circuit 4, a superior current response characteristic can be obtained by directly compensating for a d-axis simulated disturbance voltage Vdob and a q-axis simulated disturbance voltage Vqob. Moreover, a faster current response characteristic can be obtained by directly compensating for a d-axis second simulated voltage command Vdff and a q-axis second simulated voltage command Vqff.

According to a method for controlling an electric current of a synchronous motor defined in claim 6, a current feedback gain can be set to a high level by suppressing noise in the d-axis actual current Idfb and that in the q-axis actual current Iqfb. Hence, even when variations arise in parameters or power of the synchronous motor 1 and the power conversion circuit 4 under the influence of temperature, a superior current response characteristic can be obtained. Further, when an abrupt change or fluctuation has arisen in a parameter of the synchronous motor 1 and that of the power conversion circuit 4, a superior current response characteristic can be obtained by directly compensating for the d-axis simulated disturbance voltage Vdob and the q-axis simulated disturbance voltage Vqob. Moreover, a faster current response characteristic can be obtained by directly compensating for the d-axis second simulated voltage command Vdff and the q-axis second simulated voltage command Vqff. In addition, even when an abrupt change has arisen in the rotational speed of the synchronous motor, a superior current response characteristic can be obtained by directly compensating for the induced voltage.

According to a current controller of a synchronous motor defined in claim 7, feedback control is performed by use of a d-axis.simulated current Idob and a q-axis simulated current Iqob, both being obtained by a current observer section 10a, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1and the power conversion circuit 4 under the influence of temperature, a superior current response characteristic can be obtained.

According to a current controller of a synchronous motor defined in claim 8, feedback control is performed by use of the d-axis simulated current Idob and the q-axis simulated current Iqob, both being obtained by the current observer section 10b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. Further, when an abrupt change arises in the rotational speed of the synchronous motor, estimation errors in the d-axis simulated current Idob and the q-axis simulated current Iqob, both being produced by the current observer section 10b, are suppressed by compensating for the induced voltage on the basis of the induced voltage compensation section 7. Accordingly, even when an abrupt change arises in the rotational speed of the synchronous motor, a superior current response characteristic can be obtained.

According to a current controller of a synchronous motor defined in claim 9, feedback control is performed by use of the d-axis simulated current Idob and the q-axis simulated current Iqob, both being obtained by the current observer section 10b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. Further, when an abrupt change arises in the rotational speed of the synchronous motor, estimation errors in the d-axis simulated current Idob and the q-axis simulated current Iqob, both being produced by the current observer section 10a, are suppressed by compensating for the induced voltage on the basis of the induced voltage compensation section 7. Accordingly, even when an abrupt change arises in the rotational speed of the synchronous motor, a superior current response characteristic can be obtained. Also, a faster current response characteristic in response to the command can be obtained, by inputting the d-axis second simulated voltage command Vdff and the q-axis second simulated voltage command Vqff, both being produced by a feedforward control section 12, directly to a voltage command synthesizer 13.

According to a current controller of a synchronous motor defined in claim 10, feedback control is performed by use of the d-axis simulated current Idob and the q-axis simulated current Iqob, both being produced by a current observer section 14a, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. A disturbance voltage component is directly compensated by inputting a d-axis simulated disturbance voltage Vdob and a q-axis simulated disturbance voltage Vqob, both being produced by the current observer section 14a, directly to the voltage command synthesizer 15. Accordingly, even when abrupt changes or fluctuations have arisen in a parameter of the synchronous motor 1 or those of the power conversion circuit 4, a superior current response characteristic can be obtained.

According to a current controller of a synchronous motor defined in claim 11, feedback control is performed by use of the d-axis simulated current Idob and the q-axis simulated current Iqob, both being obtained by a current observer section 14a, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1 and the power conversion circuit 4 under the influence of temperature, a superior current response characteristic can be obtained. A disturbance voltage component is directly compensated by inputting the d-axis simulated disturbance voltage Vdob and the q-axis simulated disturbance voltage Vqob, both being produced by the current observer section 14a, directly to the voltage command synthesizer 15. Accordingly, even when abrupt changes or fluctuations have arisen in a parameter of the synchronous motor 1 or those of the power conversion circuit 4, a superior current response characteristic can be obtained. Also, a faster current response characteristic in response to the command can be obtained, by inputting the d-axis second simulated voltage command Vdff and the q-axis second simulated voltage command Vqff, both being produced by a feedforward control section 12, directly to a voltage command synthesizer 16.

According to a current controller of a synchronous motor defined in claim 12, feedback control is performed by use of the d-axis simulated current Idob and the q-axis simulated current Iqob, both being produced by a current observer section 14b, in place of the measured currents Idfb and Iqfb, thereby suppressing noise included in the measured currents Idfb, Iqfb and enabling setting of the feedback gains kda and kqa to high levels. Hence, even when variations arise in parameters or power of the synchronous motor 1and the power conversion circuit 4 under the influence of temperature, a superior current response characteristic can be obtained. A disturbance voltage component is directly compensated by inputting the d-axis simulated disturbance voltage Vdob and the q-axis simulated disturbance voltage Vqob, both being produced by the current observer section 14b, directly to the voltage command synthesizer 15. Accordingly, even when abrupt changes or fluctuations have arisen in a parameter of the synchronous motor 1 or those of the power conversion circuit 4, a superior current response characteristic can be obtained. Also, a faster current response characteristic in response to the command can be obtained, by inputting the d-axis second simulated voltage command Vdff and the q-axis second simulated voltage command Vqff, both being produced by a feedforward control section 12, directly to a voltage command synthesizer 16. Further, when an abrupt change arises in the rotational speed of the synchronous motor, estimation errors in the d-axis simulated current Idob and the q-axis simulated current Iqob, both being produced by the current observer section 14b, are suppressed by compensating for the induced voltage on the basis of the induced voltage compensation section 7. Accordingly, even when an abrupt change arises in the rotational speed of the synchronous motor, a superior current response characteristic can be obtained.

According to a method for controlling a synchronous motor defined in claim 13, a first speed estimation section estimates an estimated speed "w" on the basis of the q-axis actual current Iq and the q-axis voltage command Vqref. The accuracy of the estimated speed "w" does not depend directly on the resolution of the actual position θ. Accordingly, even when the sampling time is shortened, superior readiness and superior robustness can be obtained without involvement of an increase in the resolving power of an encoder.

According to a method for controlling a synchronous motor defined in claim 14, the estimated speed "w" is estimated on the basis of the d-axis actual current Id, the q-axis actual current Iq, the d-axis voltage command Vdref, and the q-axis voltage command Vqref. As a result, the accuracy of the estimated speed "w" does not depend directly on the resolution of the actual position θ. Accordingly, even when the sampling time is shortened, superior readiness and superior robustness can be obtained without involvement of an increase in the resolving power of an encoder. In addition, the accuracy of the estimated speed "w" becomes higher by utilization of the d-axis actual current Id, the q-axis actual current Iq, the d-axis voltage command Vdref, and the q-axis voltage command Vqref. Hence, a control gain of the machine control section can be set to a high level.

According to a controller of a synchronous motor defined in claim 15, a first speed estimation section rather than a differentiator 91 estimates an estimated speed "w" on the basis of the q-axis actual current Iq and the q-axis voltage command Vqref. The accuracy of the estimated speed "w" does not depend directly on the resolution of the actual position θ. Accordingly, even when the sampling time is shortened, superior readiness and superior robustness can be obtained without involvement of an increase in the resolving power of an encoder.

According to a controller of a synchronous motor defined in claim 16, a second speed estimation section 90 rather than a differentiator 91 estimates the estimated speed "w" on the basis of the d-axis actual current Id, the q-axis actual current Iq, the d-axis voltage command Vdref, and the q-axis voltage command Vqref. As a result, the accuracy of the estimated speed "w" does not depend directly on the resolution of the actual position θ. Accordingly, even when the sampling time is shortened, superior readiness and superior robustness can be obtained without involvement of an increase in the resolving power of an encoder. In addition, the second speed estimation section 90 becomes superior to the first speed estimation section 89 in terms of estimation accuracy of the estimated speed "w." Hence, a control gain of the machine control section can be set to a high level.

What is claimed is:

1. A method for controlling an electric current of a synchronous motor in which a power conversion circuit is provided with an appropriate actual voltage command such that an electric current flowing through the synchronous motor fed with power from the power conversion circuit coincides with a current command, the method comprising the steps of:

converting electric currents Iu, Iv, and Iw, flowing through the synchronous motor, into a d-axis actual current Idfb and a q-axis actual current Iqfb on rotational coordinate axes which rotate synchronously with a rotor magnetic flux vector on the basis of an actual position θ of the rotor of the synchronous motor;

estimating a d-axis simulated current Idob and a q-axis simulated current Iqob on the basis of the d-axis actual current Idfb, the q-axis actual current Iqfb, a d-axis actual voltage command Vdref, and a q-axis voltage command Vqref;

generating the d-axis actual voltage command Vdref and the q-axis actual voltage command Vqref on the basis of a d-axis current command Idref, a q-axis current command Iqref, the d-axis simulated current Idob, and the q-axis simulated current Iqob; and converting the d-axis actual voltage command Vdref and the q-axis actual voltage command Vqref into actual voltage commands Vuref, Vvref, and Vwref on the basis of the actual position θ of a rotor of the synchronous motor.

2. A method for controlling an electric current of a synchronous motor in which a power conversion circuit is provided with an appropriate actual voltage command such that an electric current flowing through the synchronous motor fed with power from the power conversion circuit coincides with a current command, the method comprising the steps of:

converting electric currents Iu, Iv, and Iw flowing through the synchronous motor into a d-axis actual current Idfb and a q-axis actual current Iqfb on rotational coordinate axes which rotate synchronously with a rotor magnetic flux vector on the basis of an actual position θ of the rotor of the synchronous motor;

estimating a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo;

generating the d-axis third simulated voltage command Vdfb and the q-axis third simulated voltage command Vqfb on the basis of the d-axis second simulated current command Idff, the q-axis second simulated current command Iqff, the d-axis simulated current Idob, and the q-axis simulated current Iqob;

adding an induced voltage to the d-axis first simulated voltage command Vdo and the q-axis first simulated voltage command Vqo on the basis of the actual position θ of a rotor of the synchronous motor, to thereby produce a d-axis actual voltage command Vdref and a q-axis actual voltage command Vqref; and converting the d-axis actual voltage command Vdref and the q-axis actual voltage command Vqref into actual voltage commands Vuref, Vvref, and Vwref on the basis of the actual position θ of a rotor of the synchronous motor.

3. A method for controlling an electric current of a synchronous motor in which a power conversion circuit is provided with an appropriate actual voltage command such that an electric current flowing through the synchronous motor fed with power from the power conversion circuit coincides with a current command, the method comprising the steps of:

generating a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref;

converting electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor;

estimating a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo;

generating a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

generating the first d-axis first simulated voltage command Vdo and the q-axis first simulated voltage command Vqo on the basis of the d-axis third simulated voltage command Vdfb, the q-axis third simulated voltage command Vqfb, the d-axis second simulated voltage command Vdff, and the q-axis second simulated voltage command Vqff;

adding an induced voltage to the d-axis first simulated voltage command Vdo and the q-axis first simulated voltage command Vqo on the basis of the actual position θ of a rotor of the synchronous motor, to thereby produce a d-axis actual voltage command Vdref and a q-axis actual voltage command Vqref; and converting the d-axis actual voltage command Vdref and the q-axis actual voltage command Vqref into actual voltage commands Vuref, Vvref, and Vwref on the basis of the actual position θ of a rotor of the synchronous motor.

4. A method for controlling an electric current of a synchronous motor in which a power conversion circuit is provided with an appropriate actual voltage command such that an electric current flowing through the synchronous motor fed with power from the power conversion circuit coincides with a current command, the method comprising the steps of:

converting electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor;

estimating a d-axis simulated current Idob, a q-axis simulated current Iqob, a d-axis simulated disturbance voltage Vdob, and a q-axis simulated voltage command Vqob on the basis of the d-axis actual current Idfb, the q-axis actual current Iqfb, a d-axis actual voltage command Vdref, and a q-axis actual voltage command Vqref;

generating a d-axis first simulated voltage command Vdo and a q-axis first simulated voltage command Vqo on the basis of a d-axis current command Idref, a q-axis current command Iqref, the d-axis simulated current Idob, and the q-axis simulated current Iqob;

generating the d-axis actual voltage command Vdref and the q-axis actual voltage command Vqref on the basis of the d-axis third simulated voltage command Vdfb, the q-axis third simulated voltage command Vqfb, the d-axis simulated disturbance voltage Vdob, and the q-axis simulated disturbance voltage Vqob; and converting the d-axis actual voltage command Vdref and the q-axis actual voltage command Vqref into actual voltage commands Vuref, Vvref, and Vwref on the basis of the actual position θ of a rotor of the synchronous motor.

5. A method for controlling an electric current of a synchronous motor in which a power conversion circuit is provided with an appropriate actual voltage command such that an electric current flowing through the synchronous motor fed with power from the power conversion circuit coincides with a current command, the method comprising the steps of:

generating a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref;

converting electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor;

estimating a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, ad-axis actual voltage command Vdref, and a q-axis actual voltage command Vqref;

generating a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

generating the d-axis actual voltage command Vdref and the q-axis actual voltage command Vqref on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; and converting the d-axis voltage command Vdref and the q-axis actual voltage command Vqref into actual voltage commands Vuref, Vvref, and Vwref on the basis of the actual position θ of a rotor of the synchronous motor.

6. A method for controlling an electric current of a synchronous motor in which a power conversion circuit with an appropriate actual voltage command such that an electric current flowing through the synchronous motor fed with power from the power conversion circuit coincides with a current command, the method comprising the steps of:

generating a d-axis second simulated current command Idff, a q-axis second simulated current command Iqff, a d-axis second simulated voltage command Vdff, and a q-axis second simulated voltage command Vqff on the basis of a d-axis current command Idref and a q-axis current command Iqref;

converting electric currents Iu, Iv, and Iw flowing through the synchronous motor into a d-axis actual current Idfb and a q-axis actual current Iqfb on rotational coordinate axes which rotate synchronously with a rotor magnetic flux vector, on the basis of an actual position θ of the rotor of the synchronous motor;

estimating a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, a d-axis first simulated voltage command Vdo, and a q-axis actual voltage command Vqo;

generating a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

generating the d-axis first simulated voltage command Vdo and the q-axis actual voltage command Vqo on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob;

adding an induced voltage to the d-axis first simulated voltage command Vdo and the d-axis first simulated voltage command Vqo on the basis of an actual position θ, to thereby produce a d-axis actual voltage command Vdref and a q-axis actual voltage command Vqref; and converting the d-axis voltage command Vdref and the q-axis actual voltage command Vqref into actual voltage commands Vuref, Vvref, and Vwref on the basis of the actual position θ of a rotor of the synchronous motor.

7. A current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor;

a current observer 10a which estimates a d-axis simulated current Idob and a q-axis simulated current Iqob on the basis of the d-axis actual current Idfb, the q-axis actual current Iqfb, a d-axis actual voltage command Vdref, and a q-axis actual voltage command Vqref;

a feedback control section 9a which produces the d-axis actual voltage command Vdref and the q-axis actual voltage command Vqref on the basis of the d-axis current command Idref, the q-axis current command Iqref, the d-axis simulated current Idob, and the q-axis simulated current Iqob; and a first coordinate converter 5 for converting the d-axis actual voltage command Vdref and the q-axis actual voltage command Vqref into the actual voltage commands Vuref, Vvref, and Vwref on the basis of an actual position θ of a rotor of the synchronous motor.

8. A current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor;

a current observer 10b which estimates a d-axis simulated current Idob and a q-axis simulated current Iqob on the basis of the d-axis actual current Idfb, the q-axis actual current Iqfb, a d-axis first simulated voltage command Vdo, and a q-axis first simulated voltage command Vqo;

a feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob;

a speed generator 8 for producing an actual speed "w" on the basis of the actual position θ;

an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

9. A current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor;

a current observer 10b which estimates a d-axis simulated current Idob and a q-axis simulated current Iqob on the basis of the d-axis actual current Idfb, the q-axis actual current Iqfb, ad-axis first simulated voltage command Vdo, and a q-axis first simulated voltage command Vqo;

a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref;

a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

a voltage command synthesizer 13 which produces the d-axis first simulated voltage command Vdo and the q-axis first simulated voltage command Vqo on the basis of the d-axis third simulated voltage command Vdfb, the q-axis third simulated voltage command Vqfb, the d-axis second simulated voltage command Vdff, and the q-axis second simulated voltage command Vqff;

a current feedback control section 9b which produces the d-axis first simulated voltage command Vdo and the q-axis first simulated voltage command Vqo on the basis of the d-axis current command Idref, the q-axis current command Iqref, the d-axis simulated current Idob, and the q-axis simulated current Iqob;

a speed generator 8 for producing an actual speed "w" on the basis of the actual position θ;

an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

10. A current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor;

a current observer 14a which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, the d-axis actual voltage command Vdref, and the q-axis actual voltage command Vqref;

a feedback control section 9b which produces a d-axis first simulated voltage command Vdo and a q-axis first simulated voltage command Vqo on the basis of the d-axis current command Idref, the q-axis current command Iqref, the d-axis simulated current Idob, and the q-axis simulated current Iqob;

a voltage command synthesizer 15 which produces the d-axis actual voltage command Vdref and the q-axis actual voltage command Vqref on the basis of the d-axis third simulated voltage command Vdfb, the q-axis third simulated voltage command Vqfb, the d-axis simulated disturbance voltage Vdob, and the q-axis simulated disturbance voltage Vqob; and a first coordinate converter 5 for converting the d-axis actual voltage command Vdref and the q-axis actual voltage command Vqref into the actual voltage commands Vuref, Vvref, and Vwref on the basis of the actual position θ.

11. A current controller of a synchronous motor which provides a power conversion circuit 4 with actual voltage commands Vuref, Vvref, and Vwref such that a d-axis actual current Idfb and a q-axis actual current Iqfb on rotational coordinate axes which rotate synchronously with the rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on rotational coordinate axes which rotate synchronously with the rotor magnetic flux vector of the synchronous motor;

a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref;

a current observer 14a which estimates a d-axis simulated disturbance current Idob and a q-axis simulated disturbance current Iqob on the basis of the d-axis actual current Idfb, the q-axis actual current Iqfb, the d-axis actual voltage command Vdref, and the q-axis actual voltage command Vqref;

a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

a voltage command synthesizer 16 which produces a d-axis actual voltage command Vdref and a q-axis actual voltage command Vqref on the basis of the d-axis second simulated voltage command Vdff, the q-axis second simulated voltage command Vqff, the d-axis third simulated voltage command Vdfb, the q-axis third simulated voltage command Vqfb, the d-axis simulated disturbance voltage Vdob, and the q-axis simulated disturbance voltage Vqob; and a first coordinate converter 5 for converting the d-axis actual voltage command Vdref and the q-axis actual voltage command Vqref into the actual voltage commands Vuref, Vvref, and Vwref on the basis of the actual position θ.

12. A current controller of a synchronous motor in which a power conversion circuit 4 is provided with actual voltage commands Vuref, Vvref, and Vwref such that a d-axis actual current Idfb and a q-axis actual current Iqfb on rotational coordinate axes which rotate synchronously with a rotor magnetic flux vector of a synchronous motor 1 coincide with a d-axis current command Idref and a q-axis current command Iqref, the controller comprising the steps of:

an actual position observation device 2 for providing an actual position θ of the synchronous motor;

an actual current observation section 3 which observes a current of two phases or more of the synchronous motor and provides actual currents Iu, Iv, and Iw;

a second coordinate converter 6 which converts, on the basis of the actual position θ, the actual currents Iu, Iv, and Iw into the d-axis actual current Idfb and the q-axis actual current Iqfb on the rotational coordinate axes which rotate synchronously with the rotor magnetic flux vector of the synchronous motor;

a feedforward control section 12 which produces a d-axis second simulated current command Idff, a q-axis second simulated current command Iqff, a d-axis second simulated voltage command Vdff, and a q-axis second simulated voltage command Vqff on the basis of the d-axis current command Idref and the q-axis current command Iqref;

a current observer 14b which estimates a d-axis simulated current Idob, a q-axis simulated current Iqob, a d-axis simulated disturbance voltage Vdob, and a q-axis simulated disturbance voltage Vqob on the basis of the d-axis actual current Idfb, the q-axis actual current Iqfb, a d-axis first simulated voltage command Vdo, and a q-axis actual voltage command Vqo;

a feedback control section 11 which produces a d-axis third simulated voltage command Vdfb and a q-axis third simulated voltage command Vqfb on the basis of the d-axis second simulated current command Idff, the q-axis second simulated current command Iqff, the d-axis simulated current Idob, and the q-axis simulated current Iqob;

a voltage command synthesizer 17 which produces the d-axis first simulated voltage command Vdo and the q-axis actual voltage command Vqo on the basis of the d-axis second simulated voltage command Vdff, the q-axis second simulated voltage command Vqff, the d-axis third simulated voltage command Vdfb, and the q-axis third simulated voltage command Vqfb;

a speed generator 8 for producing an actual speed "w" on the basis of the actual position θ;

an induced voltage compensation section 7 which adds an induced voltage to the d-axis first simulated voltage command Vdo and the q-axis first simulated voltage command Vqo on the basis of the d-axis first simulated voltage command Vdo, the q-axis first simulated voltage command Vqo, and the actual speed "w," to thereby produce the d-axis actual voltage command Vdref and the q-axis actual voltage command Vqref; and a first coordinate converter 5 for converting the d-axis actual voltage command Vdref and the q-axis actual voltage command Vqref into the actual voltage commands Vuref, Vvref, and Vwref on the basis of the actual position θ.

13. A method for controlling a synchronous motor in which a power conversion circuit is provided with appropriate actual voltage commands Vuref, Vvref, and Vwref such that a synchronous motor fed with power from the power conversion circuit approaches an actual command θref, the method comprising the steps of:

performing a machine control operation on the basis of an actual command θref, an actual position θ of a rotor of the synchronous motor, and an estimated speed "w," to thereby provide a torque command Tref;

converting electric currents Iu, Iv, and Iw flowing through the synchronous motor into a d-axis actual current Id and a q-axis actual current Iq on rotational coordinate axes which rotate synchronously with a rotor magnetic flux vector, on the basis of an actual position θ of the rotor of the synchronous motor;

performing a current control operation on the basis of the actual position θ, the torque command Tref, the d-axis actual current Id, and the q-axis actual current Iq, to thereby provide a d-axis voltage command Vdref and a q-axis voltage command Vqref;

converting the d-axis voltage command Vdref and the q-axis voltage command Vqref into actual voltage commands Vuref, Vvref, and Vwref on the basis of the actual position θ; and estimating an estimated speed "w" on the basis of the q-axis actual current Iq and the q-axis voltage command Vqref.

14. A method for controlling a synchronous motor in which a power conversion circuit is provided with appropriate actual voltage commands Vuref, Vvref, and Vwref such that a synchronous motor fed with power from the power conversion circuit approaches an actual command θref, the method comprising the steps of:

performing a machine control operation on the basis of the actual command θref, an actual position θ of a rotor of the synchronous motor, and an estimated speed "w," to thereby provide a torque command Tref;

converting electric currents Iu, Iv, and Iw flowing through the synchronous motor into a d-axis actual current Id and a q-axis actual current Iq on rotational coordinate axes which rotate synchronously with a rotor magnetic flux vector on the basis of an actual position θ of the rotor of the synchronous motor;

performance of current control operation on the basis of the actual position θ, the torque command Tref, the d-axis actual current Id, and the q-axis actual current Iq, to thereby provide a d-axis voltage command Vdref and a q-axis voltage command Vqref;

converting the d-axis voltage command Vdref and the q-axis voltage command Vqref into actual voltage commands Vuref, Vvref, and Vwref on the basis of the actual position θ; and estimating an estimated speed "w" on the basis of the d-axis actual current Id, the q-axis actual current Iq, the d-axis voltage command Vdref, and the q-axis voltage command Vqref.

15. A controller of a synchronous motor in which a power conversion circuit 84 is provided with appropriate actual voltage commands Vuref, Vvref, and Vwref such that a synchronous motor 81 fed with power from the power conversion circuit 84 approaches an actual command θref, the controller comprising the steps of:

an actual position observation device 82 for providing an actual position θ of the synchronous motor 81;

an actual current observation section 83 which observes a current of two phases or more of the synchronous motor 81 and provides actual currents Iu, Iv, and Iw;

a first coordinate conversion circuit 86 which converts, on the basis of the actual position θ, the actual currents Iu, Iv, and Iw into a d-axis actual current Id and a q-axis actual current Iq on the rotational coordinate axes which rotate synchronously with the rotor magnetic flux vector of the synchronous motor;

a machine control section 88 which performs machine control operation, to thereby provide a torque command Tref on the basis of the actual command θref, the actual position θ of a rotor of the synchronous motor, and the estimated speed "w";

a current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref;

a second coordinate conversion circuit 85 which provides the actual voltage commands Vuref, Vvref, and Vwref on the basis of the actual position θ, the d-axis actual voltage command Vdref, and the q-axis voltage command Vqref; and a first speed estimation section 89 for estimating the estimated speed "w" on the basis of the q-axis actual current Iq and the q-axis voltage command Vqref.

16. A controller of a synchronous motor in which a power conversion circuit 84 is provided with appropriate actual voltage commands Vuref, Vvref, and Vwref such that a synchronous motor 81 fed with power from the power conversion circuit 84 approaches an actual command θref, the controller comprising the steps of:

an actual position observation device 82 for providing an actual position θ of the synchronous motor 81;

an actual current observation section 83 which observes a current of two phases or more of the synchronous motor 81 and provides actual currents Iu, Iv, and Iw;

a first coordinate conversion circuit 86 which converts, on the basis of the actual position θ, the actual currents Iu, Iv, and Iw into a d-axis actual current Id and a q-axis actual current Iq on the rotational coordinate axes which rotate synchronously with the rotor magnetic flux vector of the synchronous motor;

a machine control section 88 which performs machine control operation, to thereby provide the torque command Tref on the basis of the actual command θref, the actual position θ of the rotor of the synchronous motor, and an estimated speed "w";

a current control section 87 which performs current control operation on the basis of the torque command Tref, the d-axis actual current Id, the q-axis actual current Iq, and the actual position θ, to thereby provide a d-axis voltage command Vdref and a q-axis voltage command Vqref;

a second coordinate conversion circuit 85 which provides the actual voltage commands Vuref, Vvref, and Vwref on the basis of the actual position θ, the d-axis actual voltage command Vdref, and the q-axis voltage command Vqref; and a second speed estimation section 90 for estimating the estimated speed "w" on the basis of the d-axis actual current Id, the q-axis actual current Iq, the d-axis voltage command Vdref, and the q-axis voltage command Vqref.

* * * * *